United States Patent
Nagasaki et al.

(10) Patent No.: US 7,465,413 B2
(45) Date of Patent: Dec. 16, 2008

(54) PHOSPHOR AND PLASMA DISPLAY PANEL USING THE SAME

(75) Inventors: Yoshihisa Nagasaki, Hirakata (JP); Seigo Shiraishi, Neyagawa (JP); Masahiro Sakai, Yawata (JP)

(73) Assignee: Panasonic Corporation, Osaka (JP)

(*) Notice: Subject to any disclaimer, the term of this patent is extended or adjusted under 35 U.S.C. 154(b) by 695 days.

(21) Appl. No.: 11/121,662

(22) Filed: May 4, 2005

(65) Prior Publication Data

US 2005/0269933 A1   Dec. 8, 2005

(30) Foreign Application Priority Data

May 11, 2004  (JP)  ............................. 2004-141555
May 11, 2004  (JP)  ............................. 2004-141556

(51) Int. Cl.
C09K 11/59    (2006.01)
C09K 11/54    (2006.01)

(52) U.S. Cl. ................ 252/301.6 F; 313/582; 313/584; 313/486

(58) Field of Classification Search ........... 252/301.6 F; 313/582, 584, 486
See application file for complete search history.

(56) References Cited

U.S. PATENT DOCUMENTS

| | | | |
|---|---|---|---|
| 2,171,145 A * | 8/1939 | Leverenz | 252/301.4 F |
| 2,656,320 A * | 10/1953 | Nagy et al. | 252/301.6 F |
| 4,728,459 A * | 3/1988 | Fan et al. | 252/301.5 |
| 4,925,703 A | 5/1990 | Kasenga et al. | |
| 4,950,948 A | 8/1990 | Peters et al. | |
| 5,039,449 A * | 8/1991 | Peters et al. | 252/301.5 |
| 7,270,774 B2 * | 9/2007 | Nagasaki et al. | 252/301.6 F |
| 2004/0075386 A1 | 4/2004 | Hoshino et al. | |

FOREIGN PATENT DOCUMENTS

| | | |
|---|---|---|
| EP | 0 158 778 | 10/1985 |
| EP | 377123 | * 12/1989 |
| EP | 0 377 123 | 7/1990 |
| JP | 63-268788 | 11/1988 |
| WO | WO 00/73400 | * 12/2000 |

OTHER PUBLICATIONS

Keikota Handbook (Handbook of Phosphors), edited by the Phosphor Research Society and published by Ohmsha on Dec. 25, 1987, pp. 219-220, with partial English translation and verification of translation.

* cited by examiner

Primary Examiner—C. Melissa Koslow

(57) ABSTRACT

A phosphor of the present invention is characterized by: having a phosphor main portion containing zinc silicate as a base material and manganese as an activator; and having at least one element from among titanium (Ti), zirconium (Zr), and hafnium (Hf), or having at least one element from among molybdenum (Mo) and tungsten (W), added to the phosphor main portion. The phosphor with such a composition is capable of precisely controlling the composition of a surface region (i.e. the surface including the vicinity) of each phosphor particle and improving the crystallinity, which leads to a high luminous efficiency and a reduction in time-lapse degradation.

17 Claims, 7 Drawing Sheets

PHOSPHOR AND PLASMA DISPLAY PANEL USING THE SAME

BACKGROUND OF THE INVENTION

[1] Field of the Invention

The present invention relates to a phosphor as well as a plasma display panel using the phosphor, in particular to a zinc silicate phosphor activated by manganese.

[2] Related Art

Manganese-activated zinc silicate phosphors (hereinafter, referred to as "ZSM phosphor") used for plasma display panels (hereinafter, "PDP") and fluorescent lamps are commonly used as green phosphors having a high color purity and a high luminous efficiency.

ZSM phosphors have a base material represented by a chemical formula of $Zn_2SiO_4$, however it is considered desirable to arrange the composition of the base material so that the ratio of the number of atoms between zinc (Zn) and silicon (Si) becomes 1.5, where more silicon atoms are included than in the stoichiometric composition (e.g. refer to "*Keikohtai Handbook* (Handbook of Phosphors)" edited by the Phosphor Research Society and published by Ohmsha on 25 Dec. 1987, pp. 219-220). This literature argues that, while the ratio of the number of atoms between Zn and Si in the stoichiometric composition of $Zn_2SiO_4$ is 2, it is essential that the base material of ZSM phosphors used for PDPs and fluorescent lamps includes more silicon atoms than in the stoichiometric composition in order to achieve a high luminous efficiency.

In order to manufacture ZSM phosphors, a method including the following processes is used: combining a source of silicon represented by silicon dioxide, a source of zinc represented by zinc oxide, and a source of manganese represented by manganese carbonate in a compounding ratio where the silicon component is included at a slightly higher rate than in the stoichiometric composition ratio, for the above reason; and heat-treating (baking) the combined result at a temperature of approximately 1200° C. in the atmosphere or in a reduction atmosphere (e.g. refer to "*Keikohtai Handbook* (Handbook of Phosphors)" edited by the Phosphor Research Society and published by Ohmsha on 25 Dec. 1987, pp. 219-220). In addition, since the heat treatment is conducted in a high temperature atmosphere as described above, the zinc component tends to sublime from the surface of each phosphor particle during the manufacturing operation. As a result, more silicon is present particularly in the composition of the surface of each phosphor particle, as compared to the average composition of the entire particle. It is considered that part of silicon at the surface of the particles of ZSM phosphors is present as silicon dioxide (e.g. refer to "*Keikohtai Handbook* (Handbook of Phosphors)" edited by the Phosphor Research Society and published by Ohmsha on 25 Dec. 1987, pp. 219-220).

Regarding ZSM phosphors, there is an issue of time-lapse degradation, in which the luminous efficiency decreases as the lighting time proceeds, depending on the status of use. In order to address the issue, a method has been proposed, for example, to form a layer of a silicon nitride compound on the surface of the phosphor particles when ZSM phosphors are used for fluorescent lamps (e.g. refer to Examined Patent Publication No. H06-62944). Another proposed method is shown, for example, in Japanese Patent No. 2811485 and U.S. Pat. No. 4,728,459, in which tungsten oxide is added during the manufacture of phosphors to thereby reduce the time-lapse degradation of the phosphors.

However, in various uses such as for PDPs and fluorescent lamps, it is difficult for conventional technologies, including the suggestions discussed in the above-mentioned references, to achieve compatibility between obtaining a high luminous efficiency at the beginning of the drive and reducing the degradation after a long driving period. For example, the technology suggested in the above Examined Patent Publication No. H06-62944 is practically difficult to apply to PDPs and the like because it is examined, focusing only on fluorescent lamps. That is, in a PDP, an electric discharge occurs in a very small space when the PDP is driven, and short-wavelength and high energy ultraviolet radiation exerts an impact on the phosphor. Accordingly, it is, in fact, difficult to provide protection for the phosphor even if the technology suggested in the above reference is adopted. In addition, adopting this technology for a PDP will end up creating another problem of significantly deteriorating luminous efficiency of the PDP since ultraviolet radiation for exciting the phosphor as well as visible radiation generated by emission are absorbed by the compound layer coating the phosphor particles.

It is expected that the technologies suggested in the above Japanese Patent No. 2811485 (pp. 1-2) and U.S. Pat. No. 4,728,459, involving a process of adding tungsten oxide during the manufacture, bring about an effect of reducing the time-lapse degradation in a degree. However, it is considered that they are not yet sufficient to achieve both a high luminous efficiency and a reduction in the time-lapse degradation. That is, if tungsten oxide is added in the amount suggested in these references, the luminous efficiency declines. On the other hand, if the addition amount of tungsten oxide is reduced, the effect of reducing the time-lapse degradation is not adequately obtained although the phosphor maintains the luminous efficiency at the level equivalent to that of a phosphor with no tungsten oxide added. Thus, the method employing tungsten oxide addition has a trade-off between the luminous efficiency and the reduction in the time-lapse degradation.

SUMMARY OF THE INVENTION

The present invention was made in order to solve the above issues, and aims to provide a phosphor and a PDP using the phosphor that are less likely to cause time-lapse degradation during operation in various uses and are capable of maintaining a high luminous efficiency regardless of duration of the operating time.

Inventors of the present application have examined the above issues in detail, and investigated the great importance of precisely controlling the composition of a surface region (i.e. the surface including the vicinity) of each phosphor particle and improving the crystallinity, in order to achieve compatibility between a sustainable luminous efficiency and a reduction in time-lapse degradation of a phosphor.

Based on results of the above investigation, the present invention has adopted the following structure.

The phosphor according to the present invention comprises: a phosphor main portion containing zinc silicate as a base material and manganese as an activator; and one or more additive elements selected from the group consisting of titanium, zirconium, and hafnium, being added to the phosphor main portion.

The phosphor according to the present invention comprises: a phosphor main portion containing zinc silicate as a base material and manganese as an activator; and one or more additive elements selected from the group consisting of molybdenum and tungsten, being added to the phosphor main portion.

As a result of the addition of at least one element from among Ti, Zr, and Hf, the phosphor of the present invention described above has less silicon (Si) segregation in the surface region of each particle and thereby has high crystallinity therein. In addition, the present invention also achieves an improvement in the crystallinity of the surface region by adding at least one of Mo and W to the phosphor main portion.

The phosphor of the present invention does not employ a structure in which the surface of the phosphor particles is covered by a film. Accordingly, there is no attenuation of ultraviolet radiation and visible radiation due to the absorption by the film, and thus it is possible to maintain a high luminous efficiency. In addition, the phosphor of the present invention does not involve a film formation, such as a technology proposed in the above Examined Patent Publication No. H06-62944, which avoids a reduction in the overall proportion of the phosphor in a fixed space. As a result, the phosphor of the present invention has a beneficial effect when used for a PDP that requires a formation of a phosphor layer in a small size.

Furthermore, since the selected elements are added to the phosphor main portion, the phosphor of the present invention exhibits a sufficient resistance characteristic when used for a PDP that undergoes influence from high-energy ultraviolet radiation with a short wavelength.

Accordingly, the phosphor of the present invention is less likely to cause time-lapse degradation during operation in various uses and is capable of maintaining a high luminous efficiency regardless of duration of the operating time.

It is desirable that the above phosphor of the present invention adopt the following structure.

In the present invention described above, when one or more additive elements, including at least one element selected from Ti, Zr, and Hf, are added, it is desirable from the aspect of the crystallinity in the surface region that the additive elements in total be in a proportion from 0.0001 mol to 0.01 mol, inclusive, to 1 mol of the phosphor main portion, and more preferably in a proportion from 0.0005 mol to 0.005 mol, inclusive.

In addition, when at least one element of Mo and W is added, it is desirable that the additive element in total be in a proportion from 0.00005 mol to 0.01 mol, inclusive, to 1 mol of the phosphor main portion, and more preferably in a proportion from 0.0001 mol to 0.005 mol, inclusive, or in a proportion from 0.00005 mol to 0.0005 mol, inclusive.

In the present invention described above, it is desirable from the aspect of achieving a high luminous efficiency that the ratio of the number of zinc atoms to that of silicate atoms in the surface region be set to 1.5 or more. Here, it is appropriate that the surface region is defined as a region up to 4 nm deep from the surface of each particle, in order to comprehend the composition of the phosphor.

In the present invention, a measured value obtained by X-ray photoelectron spectroscopy using AlKα X-ray radiation can be adopted as the ratio of the number of zinc atoms to that of silicon atoms. To be more specific, the ratio can be defined as a ratio of (i) a relative number of zinc atoms in the surface region, calculated from a photoelectron peak area based on a 2p3 orbital of a zinc atom to (ii) a relative number of silicon atoms in the surface region, calculated from a photoelectron peak area based on a 2p orbital of a silicon atom.

Note that, when the ratio of the number of zinc atoms to that of silicon atoms is defined as a ratio of (i) a relative number of zinc atoms in the surface region, calculated from a photoelectron peak area based on a 3p orbital of a zinc atom to (ii) a relative number of silicon atoms in the surface region, calculated from a photoelectron peak area based on a 2p orbital of a silicon atom, it is preferable that the ratio be 1.7 or more.

Since using that phosphor of the present invention which has the advantageous effects mentioned above, the PDP of the present invention exhibits both advantageous effects of high light-emission luminance and excellent resistance against degradation. In particular, it is desirable in the PDP of the present invention that the above phosphor be used as a constituent material of the green phosphor layer or part of the green phosphor.

Note that the phosphor of the present invention exhibits the above advantageous effects when used for other than a PDP, such as a fluorescent lamp, for example.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings.

DESCRIPTION OF PREFERRED EMBODIMENTS

The following gives examples in order to illustrate the best modes for implementing the present invention. Note that embodiments described below are merely examples, and the present invention is not confined to these.

1. First Embodiment 1.1 Structure of PDP 1

Figure 1:
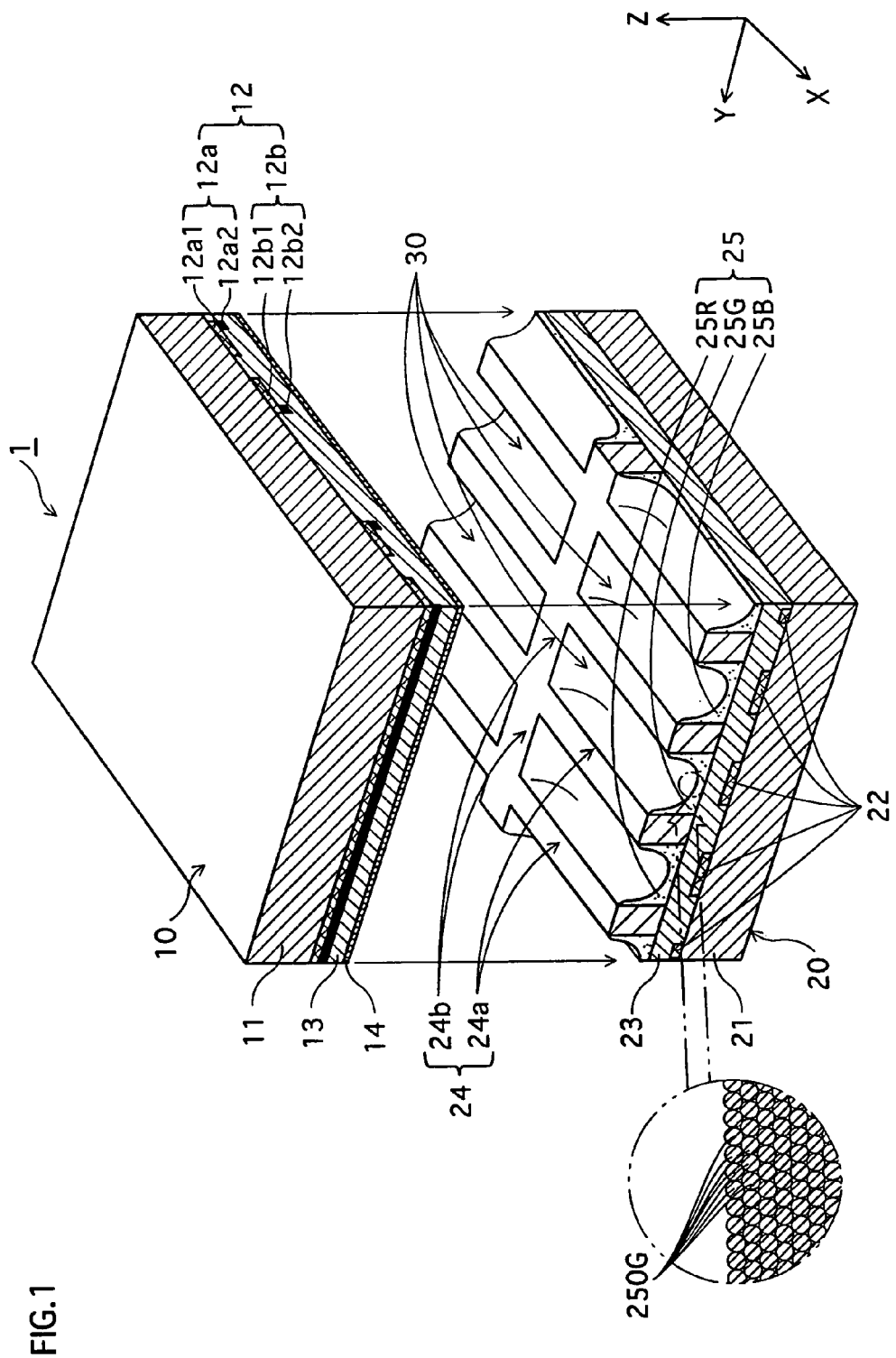
FIG. 1 is a perspective view (partial cross section) showing a main part of a PDP 1 according to a first embodiment.

The structure of a PDP 1 according to a first embodiment of the present invention is described with the aid of FIG. 1. FIG. 1 shows a perspective view (partial cross section) by extracting a part of the configuration of the PDP figuration of the PDP 1 according to the present embodiment.

1.1.1 Structure of Front Panel 10

As shown in FIG. 1, a front panel 10 has multiple pairs of display electrodes 12 disposed parallel to each other on a plane, of a front substrate 11, facing a back panel 20 (i.e. the lower plane in FIG. 1). A dielectric layer 13 and then a protective layer 14 are formed as coatings so as to cover the pairs of display electrodes 12 in the given order. Each pair of the display electrodes 12 is composed of a scan electrode (hereinafter, referred to as "Scn electrode") 12a and a sustain electrode (hereinafter "Sus electrode") 12b.

The front substrate 11 is structured, for example, from a glass having a high strain point or a soda-lime glass. The Scn and Sus electrodes 12a and 12b are respectively made by laminating a broad and transparent electrode 12a1/12b1 and a bus electrode 12a2/12b2. The transparent electrodes 12a1 and 12b1 are respectively made from ITO (indium tin oxide), $SnO_2$ (tin oxide), or ZnO (zinc oxide), for example, while the bus electrodes 12a2 and 12b2 are formed with Cr—Cu—Cr (chromium-copper-chromium), Ag (silver), or the like for decreasing electrical resistance. Regarding the size of each component structuring the electrodes 12a and 12b, the transparent electrodes 12a1 and 12b1 respectively measure 0.1 µm in thickness and 150 µm in width while the bus electrodes 12a2 and 12b2 respectively measure 7 µm in thickness and 95 µm in width, for example. The spacing between the Scn electrode 12a and Sus electrode 12b is, for example, approximately 80 µm.

The dielectric layer 13 is formed, for example, from a lead boron (Pb—B) low-melting glass material, while the protective layer 14 is structured by using MgO (magnesium oxide), $MgF_2$ (magnesium fluoride), or the like as the primary material. The dielectric layer 13 is formed with a thickness of, for example, approximately 30 µm while the protective layer 14 is formed with a thickness of, for example, 1 µm.

1.1.2 Structure of Back Panel 20

As shown in FIG. 1, the back panel 20 has multiple data electrodes (hereinafter, referred to as "Dat electrodes") 22 disposed in a stripe pattern in a direction approximately perpendicular to the display electrode pairs 12 (i.e. the x-direction) on a plane, of a back substrate 21, facing the front panel 10 (the upper plane in the FIG. 1). A dielectric layer 23 is formed so as to cover the Dat electrodes 22. On the dielectric layer 23, main barrier ribs 24a are constructed between two adjacent Dat electrodes 22, and furthermore supporting barrier ribs 24b are formed in a direction approximately perpendicular to the main barrier ribs 24a. The main barrier ribs 24a and supporting barrier ribs 24b make up barrier ribs 24 on the back panel 20. Note that, although FIG. 1 does not reveal the details, upper ends of the supporting barrier ribs 24b are set to be slightly lower than those of the main barrier ribs 24a in the z-direction. The back substrate 21 is also structured, for example, from a glass having a high strain point or a soda-lime glass.

The Dat electrodes 22 may be made from other than Ag, such as metals like gold (Au), chromium (Cr), copper (Cu), nickel (Ni), and platinum (Pt), or may be formed by combining these metals using a laminating technique. The size of individual Dat electrode 22 is set to, for example, 5 µm in thickness and 60 µm in width. The spacing between two adjacent Dat electrodes 22 is, for example, approximately 150 µm. The dielectric layer 23 is formed, for example, from a Pb—B low-melting glass material, however, aluminum oxide ($Al_2O_3$) or titanium oxide ($TiO_2$) may be included therein. The barrier ribs 24 are formed by using, for example, a lead glass material. The thickness of the dielectric layer 23 is set, for example, to approximately 30 µm.

Regarding the design size of the barrier ribs 24, in a case when the PDP 1 according to the present embodiment has, for instance, a 42-inch VGA (video graphics array), a pitch in the x-direction (i.e. a pitch between two adjacent supporting barrier ribs 24b) is about 1080 µm while the pitch in the y-direction (a pitch between two adjacent main barrier ribs 24a) is about 360 µm. The height and width of the barrier ribs 24 are about 150 µm and 40 µm, respectively.

Provided on the internal surface of individual depressions formed with the dielectric layer 23 and barrier ribs 24 is a phosphor layer 25. The phosphor layer 25 is divided into a red (R) phosphor layer 25R, a green (G) phosphor layer 25G, and a blue (B) phosphor layer 25B according to emission wavelengths caused by the entrance of ultraviolet radiation which excites the phosphor layers, and is formed by applying one of these color phosphor layers to each depression. For example, as shown in the magnified figure of FIG. 1, the G phosphor layer 25G is composed of particulate G phosphor 250G.

Phosphors structuring the R, G, and B phosphor layers 25R, 25G, and 25B, respectively, have the following compositions, for example.

R phosphor—$(Y,Gd)BO_3$:Eu
G phosphor—$Zn_{1.9}SiO_4Mn_{0.1}\alpha_x$
B phosphor—$BaMgAl_{10}O_{17}$:Eu In the composition of the G phosphor 250G, "α" includes a selected particular element, which is a feature of the present embodiment. This will be described later.

1.1.3 Alignment of Front Panel 10 and Back Panel 20

As shown in FIG. 1, the PDP 1 has a structure in which: the front panel 10 and back panel 20 are held together with the barrier ribs 24, which are formed on the back panel 20, sandwiched therebetween and functioning as a gap member; the display electrode pairs 12 are placed substantially perpendicular to the Dat electrodes 22; and in this state of things, the peripheral edges of the front and back panels 10 and 20 are closed tightly. With this structure, discharge spaces 30 partitioned by the barrier ribs 24 are formed between the front panel 10 and back panel 20, and the front and back panels 10 and 20 together form a hermetically sealed container. Filled in the discharge spaces 30 in the PDP 1 is discharge gas formed by mixing Ne, Xe, He, and the like. The charged pressure of the discharge gas is, for example, around $6.7 \times 10^4$ Pa to $1.0 \times 10^5$ Pa.

Note that, although a partial pressure of Xe in the discharge gas is generally set to less than 7%, it may be set to 7% or more, or even to 10% or more, in order to improve the light-emission luminance.

In the PDP 1, a discharge cell (not shown) is formed at each point where the display electrode pairs 12 and Dat electrodes 22 intersect with each other in three dimensions. Multiple discharge cells are arranged in a matrix in the PDP 1, and a single pixel is composed of three discharge cells of R, G, and B. A pixel size of the PDP 1 is, for example, 1080 µm×1080 µm.

1.2 Driving Method of PDP 1

The driving method of the PDP 1 is described next. Note that the driving method of the PDP 1 according to the present embodiment is the same as that of a conventional PDP, and therefore no graphic representation is given here.

A PDP device, which is a display unit, is formed by connecting drive members, each including a corresponding driver, to respective electrodes 12a, 12b, and 22 of the PDP 1 according to the present embodiment (not shown).

In regard to driving the PDP device having the PDP 1 as a display panel, for example, one field is divided into 8 subfields SF1 to SF8, and the number of sustain pulses is set so that the relative ratio of the luminance of respective subfields becomes 1:2:4:8:16:32:64:128. Then, the turning-on and -off of respective subfields SF1-SF8 are controlled according to data of display luminance, and herewith 256 gray levels can be displayed by changing a combination of the eight subfields SF1-SF8. Note that the PDP 1 that displays 256 gray levels is used in the present embodiment as an example, however, the present invention is not confined to this.

Each of the subfields SF1-SF8 is composed of a set-up period, a writing period, and a sustaining period. Regarding the set-up periods and the writing periods, fixed amounts of time common to all the subfields SF1-SF8 are allocated, respectively. On the other hand, the sustaining periods are individually set according to time lengths corresponding to a relative ratio of the luminance. For example, when the PDP 1 is driven for display, first, set-up electric discharge is generated at all discharge cells in the set-up periods, and thereby an influence from electric discharge conducted by a subfield preceding a current subfield in each of the discharge cells is eliminated and variations in the discharge characteristic are absorbed (Initialization of Discharge Cells).

Next, in the writing periods, the multiple Scn electrodes 12a are scanned with respect to each line based on subfield data, and minute discharges (writing discharges) are generated between the Scn electrodes 12a and Dat electrodes 22. Thus, required wall charges are accumulated on the surface of the protective layer 14 of the front panel 10 in discharge cells where writing discharges, which are minute electric discharges, are generated between the Scn electrodes 12a and Dat electrodes 22.

Subsequently, in the sustaining periods, rectangular-wave sustain pulses are applied to both the Scn electrodes 12a and Sus electrodes 12b at a predetermined voltage at a constant frequency. The sustain pulses applied to the Scn electrodes 12a and those applied to the Sus electrodes 12b have the same frequency, but are half a cycle out of phase with each other. These sustain pulses are applied to all discharge cells of the PDP 1.

According to the application of the sustain pulses, in the sustaining periods, potential differences are generated between the Scn electrodes 12a and Sus electrodes 12b. In each of discharge cells where writing discharges were generated, a potential difference obtained by combining the potential difference between the Scn and Sus electrodes 12a and 12b and the wall charge accumulated therein during the writing periods exceeds the discharge starting voltage, and then a sustaining discharge is generated therein.

Vacuum ultraviolet radiation (wavelength: 147 nm) generated due to the sustaining discharge excites each of the phosphor layers 25R, 25G, and 25B to thereby glow, and herewith visible light is output from the front panel 10 side. Such operations are repeated for all the subfields SF1-SF8, and herewith, discharge cells arranged in a regular pattern are selectively caused to discharge to emit light according to the display data, and video images are displayed in the display area of the PDP 1.

Note that short rectangular pulses may be applied to the Dat electrodes 22 in the sustaining period in order to improve the luminance.

1.3 G Phosphor 250G

The G phosphor 250G, which is a characteristic of the present embodiment, is described next.

In the PDP 1 according to the present embodiment, a material having the following composition is used as the G phosphor 250G structuring the G phosphor layer 25G.

G phosphor 250G—$Zn_{1.9}SiO_4:0.1Mn:0.001Ti$

Namely, the G phosphor 250G of the present embodiment has titanium (Ti) as an additive element, α. The addition ratio of Ti is, as shown in the above composition formula, in the range of 0.0001 mol to 0.01 mol per 1 mol of the main portion of the phosphor, $(Zn_{1.9}SiO_4Mn_{0.1})$. Note that it is more preferable that the addition ratio of Ti be in the range of 0.0005 mol to 0.005 mol per 1 mol of the phosphor main portion.

Regarding the G phosphor 250G of the present embodiment, the ratio of the number of zinc atoms (Zn) to that of silicate atoms (Si) in a surface region of the particle (hereinafter, referred to as "surface region Zn—Si ratio") is set to 1.5 or more. Here, the surface region Zn—Si ratio of the particle surface region is a measured value obtained by X-ray photoelectron spectroscopy (XPS) using AlKα radiation. More specifically, by using the XPS, the surface region Zn—Si ratio can be expressed as a ratio between: the relative number of silicon atoms at the phosphor particle surface region calculated from the photoelectron peak area based on the 2p orbital of a silicon atom; and the relative number of zinc atoms at the phosphor particle surface region calculated from the photoelectron peak area based on the 2p3 orbital of a zinc atom (Ratio Estimation I).

Note that the "surface region of the particle" of the G phosphor 250G denotes the surface of the particle including the vicinity and, more specifically, a region up to 4 nm deep from the surface of each particle.

In addition, the surface region Zn—Si ratio may also be evaluated by employing another ratio estimation with the use of the XPS using AlKα X-ray radiation. Here, the surface region Zn—Si ratio is found as a ratio between: the relative number of silicon atoms at the phosphor particle surface region calculated from the photoelectron peak area based on the 2p orbital of a silicon atom; and the relative number of zinc atoms at the phosphor particle surface region calculated from the photoelectron peak area based on the 3p orbital of a zinc atom (Ratio Estimation II). The surface region Zn—Si ratio of the G phosphor 250G is desirably set to 1.7 or more when evaluated by Ratio Estimation II.

1.4 Advantageous Effects of G Phosphor 250G and PDP 1

Regarding the G phosphor 250G of the present embodiment, Ti is added in the above ratio to the main portion of the phosphor $(Zn_{1.9}SiO_4Mn_{0.1})$ as described above, which results in less silicon (Si) segregation in the particle surface region (e.g. a region up to 4 nm deep from the particle surface) and therefore leads to high crystallinity.

In addition, the G phosphor 250G has no film formed on the surface of the phosphor particles unlike in the case of Examined Patent Publication No. H06-62944, and therefore there is no attenuation of ultraviolet radiation and visible radiation due to the absorption by the film. Thus, it is possible to maintain a high luminous efficiency, and furthermore the proportion of the phosphor in a space where the phosphor exists is maintained at a high level since no film is formed. As a result, the G phosphor 250G is capable of maintaining a high luminous efficiency even when used for forming the phosphor layer 25 with a reduced size of the PDP 1 according to the present embodiment, for example.

Furthermore, since Ti is added to the main portion $(Zn_{1.9}SiO4Mn_{0.1})$, the G phosphor 250G of the present embodiment has a short wavelength and exhibits a sufficient resistance characteristic against degradation when used in the PDP 1 which undergoes influence from high-energy ultraviolet radiation.

Accordingly, the G phosphor 250G of the present embodiment is less likely to cause time-lapse degradation during operation and is capable of maintaining a high luminous efficiency regardless of duration of the operating time.

Note that it is possible to achieve compatibility between a high luminous efficiency and a degradation resistance characteristic by setting the addition ratio of Ti in the G phosphor 250G to be in the above range. In addition, since the surface region Zn—Si ratio in Ratio Estimation I is 1.5 or more, or the surface region Zn—Si ratio in Ratio Estimation II is 1.7 or more, the G phosphor 250G is further effective for reducing the time-lapse degradation during operation.

Since the G phosphor 250G having the above advantageous effects has been adopted as a constituent material of the G phosphor layer 25G, the PDP 1 of the present embodiment is less likely to cause time-lapse degradation in the G-phosphor layer 25G during operation, and is capable of maintaining a high luminous efficiency regardless of the duration of the driving time and achieving high image quality.

1.5 Variations of Additive Element α in G Phosphor 250G

In the present embodiment, Ti is adopted as an example of the elements added to the phosphor main portion ($Zn_{1.9}SiO_4Mn_{0.1}$), however, zirconium (Zr), hafnium (Hf), or the combination of these two may be used instead. When such an element is adopted, it is still the case that the addition ratio should desirably be in the range of 0.0001 mol to 0.01 mol per 1 mol of the, phosphor main portion ($Zn_{1.9}SiO_4Mn_{0.1}$), and more preferably in the range of 0.0005 mol to 0.005 mol. For example, the following compositions may be adopted.

$Zn_{1.9}SiO_4Mn_{0.1}$:0.0005Ti:0.0005Zr
$Zn_{1.9}SiO_4Mn_{0.1}$:0.0005Zr:0.0005Hf
$Zn_{1.9}SiO_4Mn_{0.1}$:0.0005Hf:0.0005Ti
$Zn_{1.9}SiO_4Mn_{0.1}$:0.0005Ti:0.0002Zr:0.003Hf

Note that different variations other than these may be adopted, as will hereinafter be described.

1.6 Method for Manufacturing G Phosphor 250G

Figure 2:
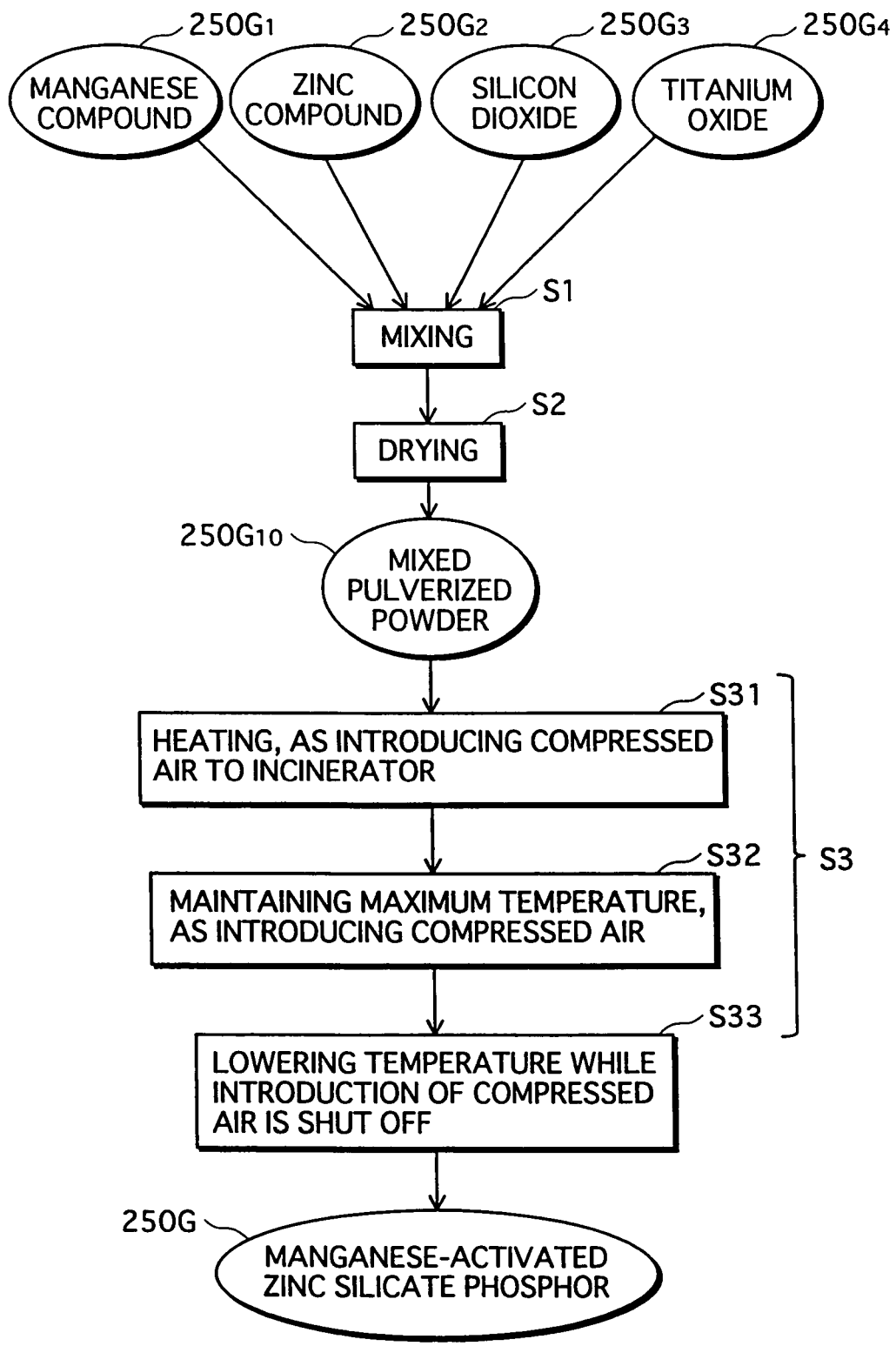
FIG. 2 is a diagram showing a procedure for manufacturing a green phosphor 250G.
Figure 3:
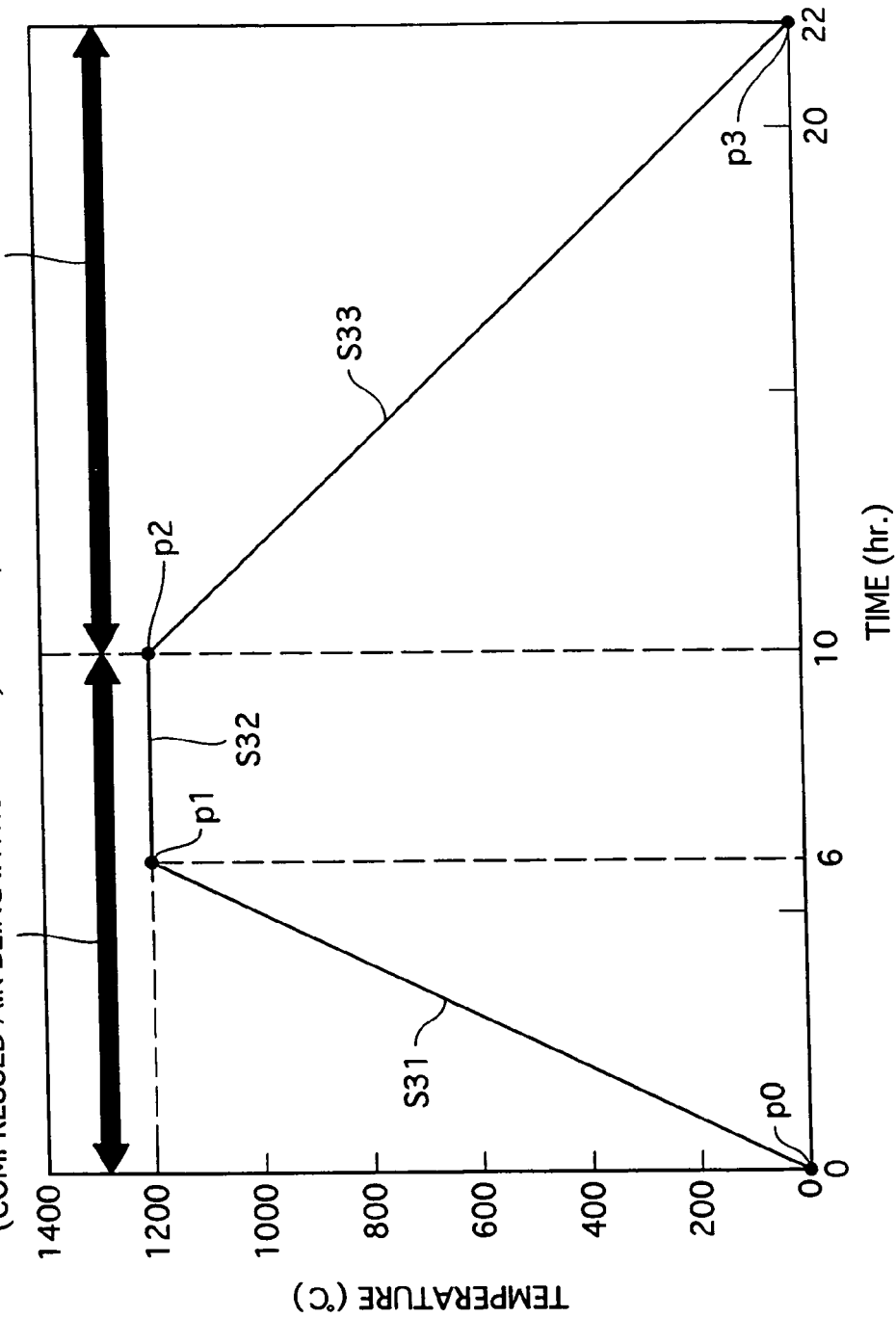
FIG. 3 is a diagram of a temperature profile showing a change in temperature at a baking step S3 in a manufacturing operation of the green phosphor 250G.

The following explains a method for manufacturing the G phosphor 250G according to the present embodiment, with the aid of FIGS. 2 and 3.

As shown in FIG. 2, a manganese compound $250G_1$, a zinc compound $250G_2$, silicon dioxide $250G_3$, and titanium oxide $250G_4$ are used as raw materials. Of these, the manganese compound $250G_1$ is used as a source of manganese, and the examples of this are high-purity (purity: 99% or more) manganese hydroxide, manganese carbonate, manganese nitrate, manganese halide, and manganese oxalate, and the like, each of which forms manganese oxide when baked. The present embodiment uses $MnCO_3$ as an example.

The zinc compound $250G_2$ is a source of zinc, and the examples of this are high-purity (purity: 99% or more) zinc hydroxide, zinc carbonate, zinc nitrate, zinc halide, zinc oxalate, and the like, each of which forms zinc oxide when baked. The present embodiment uses ZnO as an example.

The silicon dioxide $250G_3$ is a source of silicon, and a high-purity (purity: 99% or more) compound. The present embodiment uses $SiO_2$ as an example.

The titanium oxide $250G_4$ is a source of titanium, and the example of this is high-purity (purity: 99% or more) titanium dioxide.

Note that, regarding materials to be used as a source of manganese, high-purity (purity: 99% or more) manganese oxide may be directly used instead of the above manganese compound $250G_1$. Similarly, regarding materials to be used as a source of zinc, high-purity (purity: 99% or more) zinc oxide may be directly used instead of the above zinc compound $250G_2$. Regarding materials to be used as a source of silicon, silicon hydroxide that is obtained by hydrolysis of a silicon alkoxide compound such as ethyl silicate, may be employed instead of the above silicon dioxide $250G_3$.

As shown in FIG. 2, the four raw materials $250G_1$, $250G_2$, $250G_3$, and $250G_4$, above are mixed (Step S1). The mixing ratio of these raw materials for forming the above G phosphor 250G is, for example, as follows:

$MnCO_3$ (e.g. produced by Kojundo Chemical Laboratory Co., Ltd.): 0.10 mol (1.076 g);

ZnO (e.g. produced by Kojundo Chemical Laboratory Co., Ltd.): 1.90 mol (13.636 g);

$SiO_2$ (e.g. produced by Kojundo Chemical Laboratory Co., Ltd.): 1.00 mol (5.298 g); and $TiO_2$ (e.g. produced by Kojundo Chemical Laboratory Co., Ltd.): 0.001 mol (0.004 g).

For mixing in Step S1, a V-type mixer or an agitator, both of which are used in general, or a ball mill having a grinding function, a vibration mill, a jet mill, or the like may be employed as a blending machine.

After mixing the four raw materials $250G_1$, $250G_2$, $250G_3$, and $250G_4$ in Step S1, mixed pulverized powder $250G_{10}$ is obtained by drying the mixture (Step S2). Here in Step S1, for example, the above raw materials are put in a polyethylene container of an internal diameter of 70 mm and a depth of 80 mm (i.e. a capacity of approximately 300 cc), loaded on the blending machine together with 150 g of stabilizing zirconia balls of 3 mm in diameter and 80 cc of purified water, and mixed for 24 hours at a speed of 150 r.p.m. Then, in Step S2, the resulting mixture obtained in Step S1 is dried for 4 hours with the use of a hot-air dryer.

Next, in Step S3, for example, about 5 g of the above mixed pulverized powder $250G_{10}$ is loaded on an alumina board (approximately 10 mm×100 mm), and baked, in this state of things, in a tubular incinerator of an internal diameter of approximately 100 mm and a length of 1500 mm. Step S3 of the baking process is composed of Substep S31 involving application of heat, Substep S32 of maintaining the maximum temperature, and Substep S33 of lowering the temperature. Conditions, such as temperature, in Step S3 of the baking process are described with the aid of FIG. 3.

As shown in FIG. 3, in Substep S31, compressed air is introduced into the tubular incinerator at a rate of 1 litter per minute, and the temperature is heated up to 1200° C. (Point p1) at a temperature rising rate of 200° C. per hour from the room temperature (Point p0). Then, in Substep S32, the temperature is maintained at 1200° C. for four hours (the maximum temperature is maintained from Point p1 to Point p2).

Next, in Substep S33, the introduction of the compressed air into the tubular incineration is shut off, and the temperature is lowered in about 12 hours (from Point p2 to Point p3).

As shown in FIG. 2, when the baking step S3 is completed, the G phosphor 250G which is a manganese-activated zinc silicate phosphor having the above structure is obtained.

Note that the conditions regarding the temperature and time of the baking process shown in FIG. 3 are merely examples, and the G phosphor 250G is not limited to these conditions. A type and an amount of gas introduced to the incinerator require adjustments accordingly depending on, such as: materials used; particle shapes and specific surfaces of the materials; an ultimate shape of the phosphor 250G desired to obtain; and a size and shape of baked powder used.

1.7 Confirmation of Advantageous Effects

Figure 4:
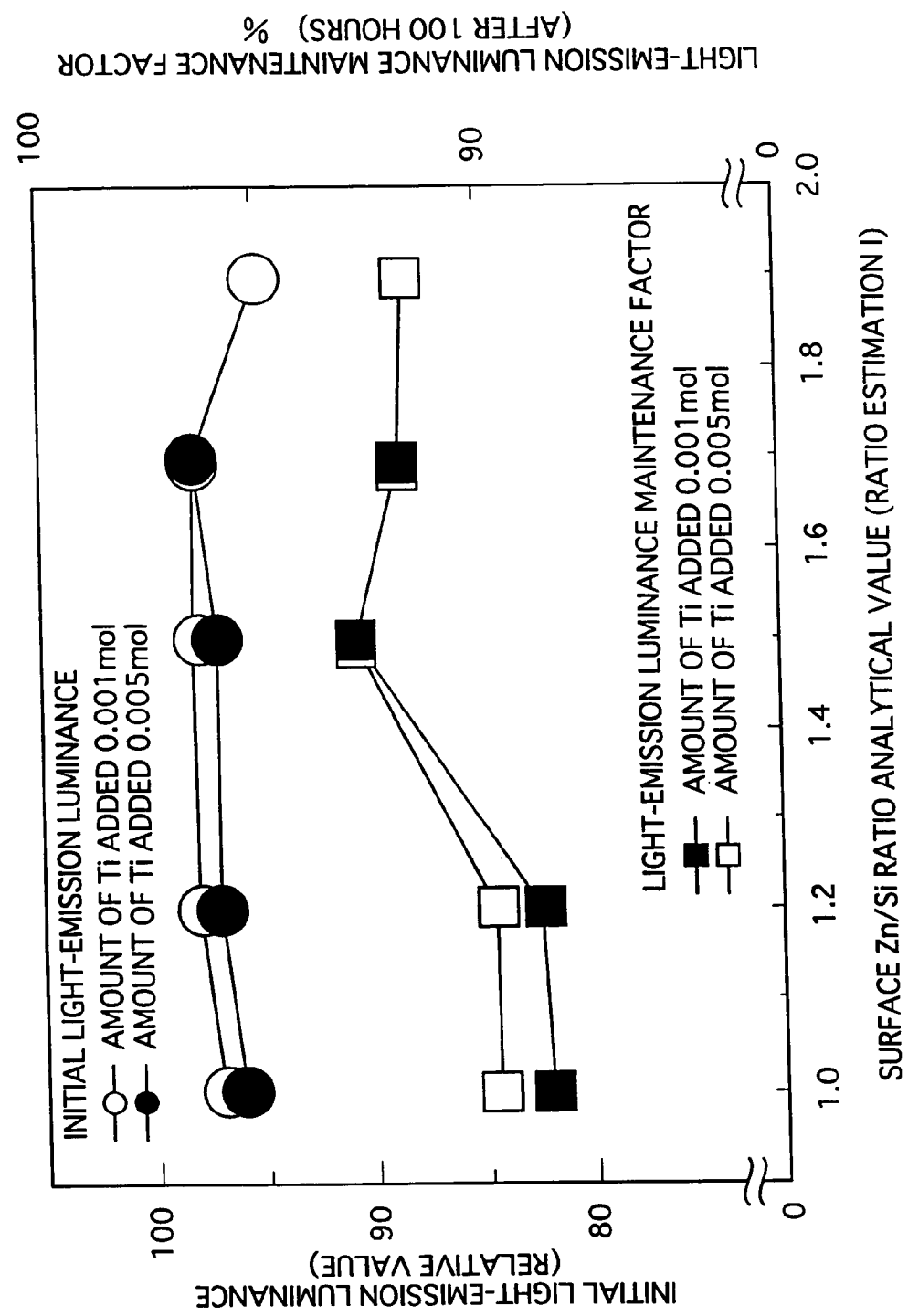
FIG. 4 is a characteristic diagram showing relationships among a surface region Zn—Si ratio analytical value, an initial light-emission luminance, and a light-emission luminance maintenance factor, regarding phosphors of a practical and a comparative examples.
Figure 5:
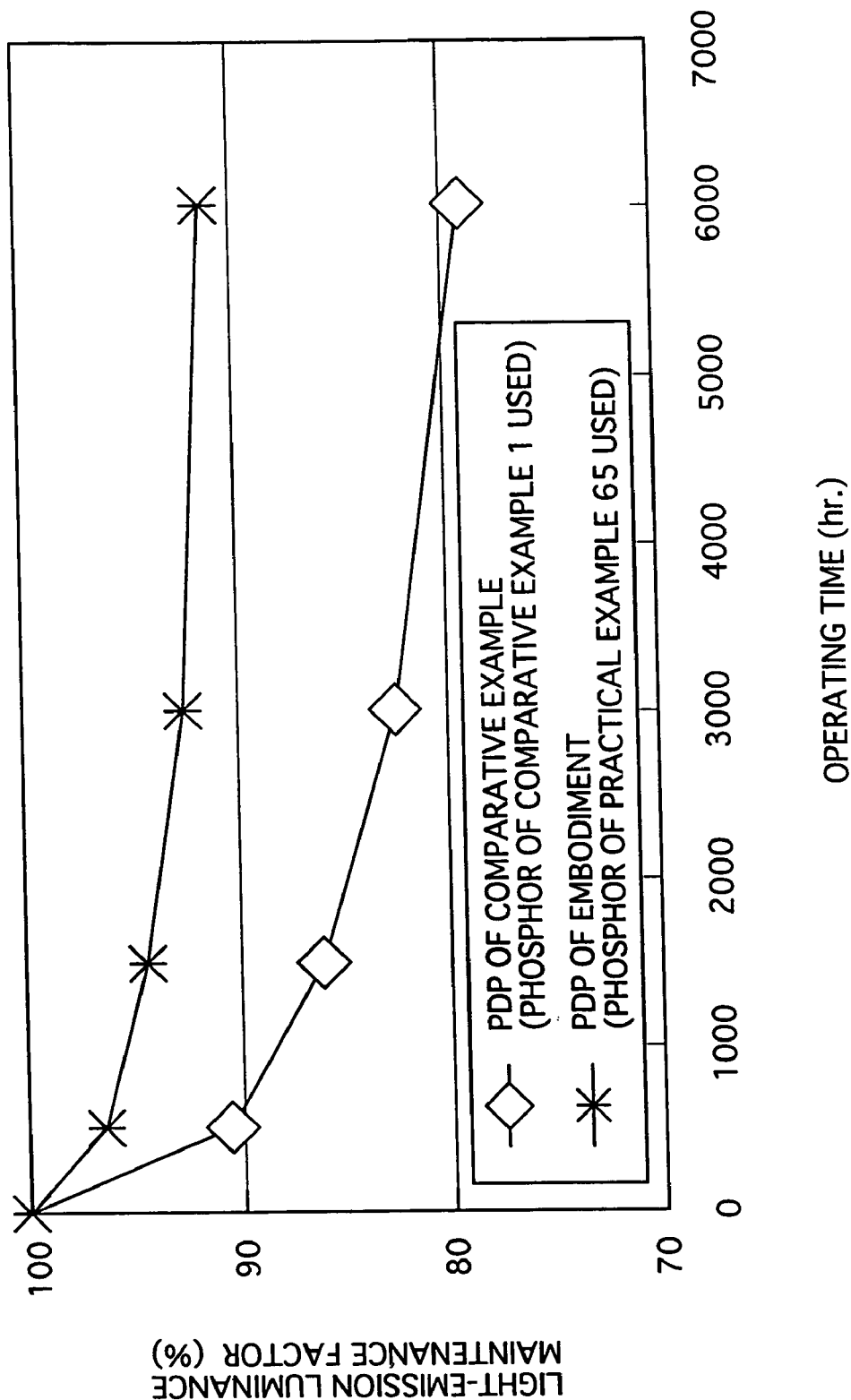
FIG. 5 is a characteristic diagram showing relationships between operating time and a light-emission luminance maintenance factor, regarding a PDP using a practical example's phosphor and a PDP using a comparative example's phosphor.

The following describes results of a confirmatory study conducted on the above-mentioned advantageous effects of the G phosphor 250G and the PDP 1 having the G phosphor 250 according to the present embodiment, with the aid of Tables 1 to 3 as well as FIGS. 4 and 5. The compositions of samples used in the study are shown in Tables 1 to 3.

TABLE 1

| | Additive Elements and Amount of Addition (mol) | | | | Analytical Value of Surface Region Zn—Si Ratio | | Relative Light-Emission Luminance | | Maintenance Factor of Light-Emission Luminance (%) |
|---|---|---|---|---|---|---|---|---|---|
| | Ti | Zr | Hf | Total | Rat. Est.*1 I | Rat. Est. II | Initial Phase | After 100-hr. | |
| C.*2 1 | — | — | — | — | 1.0 | 1.2 | 100 | 74 | 74.0 |
| P.*3 1 | 0.00005 | — | — | 0.00005 | 1.0 | 1.2 | 100 | 76 | 76.0 |
| P. 2 | 0.0001 | — | — | 0.0001 | 1.0 | 1.2 | 99 | 79 | 79.8 |
| P. 3 | 0.0005 | — | — | 0.0005 | 1.0 | 1.2 | 97 | 82 | 84.5 |
| P. 4 | 0.001 | — | — | 0.001 | 1.0 | 1.2 | 97 | 87 | 89.7 |
| P. 5 | 0.002 | — | — | 0.002 | 1.0 | 1.2 | 96 | 86 | 89.6 |
| P. 6 | 0.005 | — | — | 0.005 | 1.0 | 1.2 | 96 | 85 | 88.5 |
| P. 7 | 0.01 | — | — | 0.01 | 1.0 | 1.2 | 91 | 83 | 91.2 |
| P. 8 | 0.02 | — | — | 0.02 | 1.0 | 1.2 | 88 | 80 | 90.9 |
| P. 9 | — | 0.00005 | — | 0.00005 | 1.0 | 1.2 | 100 | 76 | 76.0 |
| P. 10 | — | 0.0001 | — | 0.0001 | 1.0 | 1.2 | 98 | 77 | 78.6 |
| P. 11 | — | 0.0005 | — | 0.0005 | 1.0 | 1.2 | 97 | 82 | 84.5 |
| P. 12 | — | 0.001 | — | 0.001 | 1.0 | 1.2 | 95 | 84 | 88.4 |
| P. 13 | — | 0.002 | — | 0.002 | 1.0 | 1.2 | 95 | 84 | 88.4 |
| P. 14 | — | 0.005 | — | 0.005 | 1.0 | 1.2 | 93 | 84 | 90.3 |
| P. 15 | — | 0.01 | — | 0.01 | 1.0 | 1.2 | 93 | 85 | 91.4 |
| P. 16 | — | 0.02 | — | 0.02 | 1.0 | 1.2 | 89 | 82 | 92.1 |
| P. 17 | — | — | 0.00005 | 0.00005 | 1.0 | 1.2 | 99 | 76 | 76.8 |
| P. 18 | — | — | 0.0001 | 0.0001 | 1.0 | 1.2 | 99 | 77 | 77.8 |
| P. 19 | — | — | 0.0005 | 0.0005 | 1.0 | 1.2 | 97 | 80 | 82.5 |
| P. 20 | — | — | 0.001 | 0.001 | 1.0 | 1.2 | 96 | 84 | 87.5 |
| P. 21 | — | — | 0.002 | 0.002 | 1.0 | 1.2 | 91 | 80 | 87.9 |
| P. 22 | — | — | 0.005 | 0.005 | 1.0 | 1.2 | 86 | 79 | 91.9 |
| P. 23 | — | — | 0.01 | 0.01 | 1.0 | 1.2 | 85 | 77 | 90.6 |
| P. 24 | — | — | 0.02 | 0.02 | 1.0 | 1.2 | 85 | 77 | 90.6 |
| P. 25 | 0.00005 | 0.00005 | — | 0.0001 | 1.0 | 1.2 | 100 | 80 | 80.0 |
| P. 26 | — | 0.00005 | 0.00005 | 0.0001 | 1.0 | 1.2 | 100 | 78 | 78.0 |
| P. 27 | 0.00005 | — | 0.00005 | 0.0001 | 1.0 | 1.2 | 99 | 79 | 79.8 |
| P. 28 | 0.00002 | 0.00003 | 0.00005 | 0.0001 | 1.0 | 1.2 | 99 | 80 | 80.8 |
| P. 29 | 0.0003 | 0.0002 | — | 0.0005 | 1.0 | 1.2 | 96 | 81 | 84.4 |
| P. 30 | — | 0.0002 | 0.0003 | 0.0005 | 1.0 | 1.2 | 95 | 81 | 85.3 |
| P. 31 | 0.0003 | — | 0.0002 | 0.0005 | 1.0 | 1.2 | 96 | 83 | 86.5 |
| P. 32 | 0.0001 | 0.0002 | 0.0002 | 0.0005 | 1.0 | 1.2 | 95 | 82 | 86.3 |
| P. 33 | 0.0005 | 0.0005 | — | 0.001 | 1.0 | 1.2 | 95 | 80 | 84.2 |
| P. 34 | — | 0.0005 | 0.0005 | 0.001 | 1.0 | 1.2 | 96 | 82 | 85.4 |
| P. 35 | 0.0005 | — | 0.0005 | 0.001 | 1.0 | 1.2 | 94 | 82 | 87.2 |
| P. 36 | 0.0005 | 0.0002 | 0.0003 | 0.001 | 1.0 | 1.2 | 95 | 84 | 88.4 |
| P. 37 | 0.003 | 0.002 | — | 0.005 | 1.0 | 1.2 | 95 | 84 | 88.4 |
| P. 38 | — | 0.002 | 0.003 | 0.005 | 1.0 | 1.2 | 94 | 82 | 87.2 |
| P. 39 | 0.003 | — | 0.002 | 0.005 | 1.0 | 1.2 | 90 | 81 | 90.0 |
| P. 40 | 0.002 | 0.001 | 0.002 | 0.005 | 1.0 | 1.2 | 95 | 82 | 86.3 |

*1 Ratio Estimation
*2 Comparative Example
*3 Practical Example

TABLE 2

| | Additive Elements and Amount of Addition (mol) | | | | Analytical Value of Surface Region Zn—Si Ratio | | Relative Light-Emission Luminance | | Maintenance Factor of Light-Emission Luminance (%) |
|---|---|---|---|---|---|---|---|---|---|
| | Ti | Zr | Hf | Total | Rat. Est. I | Rat. Est. II | Initial Phase | After 100-hr. | |
| C. 1 | — | — | — | — | 1.0 | 1.2 | 100 | 74 | 74.0 |
| P. 41 | 0.001 | — | — | 0.001 | 1.2 | 1.4 | 98 | 88 | 89.8 |
| P. 42 | 0.005 | — | — | 0.005 | 1.2 | 1.4 | 97 | 86 | 88.7 |
| P. 43 | — | 0.001 | — | 0.001 | 1.2 | 1.4 | 97 | 84 | 86.6 |
| P. 44 | — | 0.005 | — | 0.005 | 1.2 | 1.4 | 95 | 84 | 88.4 |
| P. 45 | — | — | 0.001 | 0.001 | 1.2 | 1.4 | 96 | 85 | 88.5 |

TABLE 2-continued

| | Additive Elements and Amount of Addition (mol) | | | | Analytical Value of Surface Region Zn—Si Ratio | | Relative Light-Emission Luminance | | Maintenance Factor of Light-Emission Luminance (%) |
|---|---|---|---|---|---|---|---|---|---|
| | Ti | Zr | Hf | Total | Rat. Est. I | Rat. Est. II | Initial Phase | After 100-hr. | |
| P. 46 | — | — | 0.005 | 0.005 | 1.2 | 1.4 | 87 | 79 | 90.8 |
| P. 47 | 0.0001 | — | — | 0.0001 | 1.5 | 1.7 | 97 | 83 | 85.6 |
| P. 48 | 0.001 | — | — | 0.001 | 1.5 | 1.7 | 98 | 90 | 91.8 |
| P. 49 | 0.005 | — | — | 0.005 | 1.5 | 1.7 | 97 | 89 | 91.8 |
| P. 50 | 0.01 | — | — | 0.01 | 1.5 | 1.7 | 92 | 86 | 93.5 |
| P. 51 | — | 0.0001 | — | 0.0001 | 1.5 | 1.7 | 97 | 85 | 87.6 |
| P. 52 | — | 0.001 | — | 0.001 | 1.5 | 1.7 | 97 | 86 | 88.7 |
| P. 53 | — | 0.005 | — | 0.005 | 1.5 | 1.7 | 95 | 86 | 90.5 |
| P. 54 | — | 0.01 | — | 0.01 | 1.5 | 1.7 | 91 | 84 | 92.3 |
| P. 55 | — | — | 0.0001 | 0.0001 | 1.5 | 1.7 | 97 | 85 | 87.6 |
| P. 56 | — | — | 0.001 | 0.001 | 1.5 | 1.7 | 95 | 86 | 90.5 |
| P. 57 | — | — | 0.005 | 0.005 | 1.5 | 1.7 | 88 | 78 | 88.6 |
| P. 58 | — | — | 0.01 | 0.01 | 1.5 | 1.7 | 85 | 77 | 90.6 |
| P. 59 | 0.001 | — | — | 0.001 | 1.7 | 2.0 | 98 | 89 | 90.8 |
| P. 60 | 0.005 | — | — | 0.005 | 1.7 | 2.0 | 98 | 90 | 91.8 |
| P. 61 | — | 0.001 | — | 0.001 | 1.7 | 2.0 | 98 | 86 | 87.8 |
| P. 62 | — | 0.005 | — | 0.005 | 1.7 | 2.0 | 96 | 86 | 89.6 |
| P. 63 | — | — | 0.001 | 0.001 | 1.7 | 2.0 | 95 | 85 | 89.5 |
| P. 64 | — | — | 0.005 | 0.005 | 1.7 | 2.0 | 89 | 79 | 88.8 |
| P. 65 | 0.001 | — | — | 0.001 | 1.9 | 2.2 | 95 | 88 | 92.6 |
| P. 66 | — | 0.001 | — | 0.001 | 1.9 | 2.2 | 95 | 84 | 88.4 |
| P. 67 | — | — | 0.001 | 0.001 | 1.9 | 2.2 | 94 | 84 | 89.4 |

TABLE 3

| | Additive Elements and Amount of Addition (mol) | | | | Analytical Value of Surface Region Zn—Si Ratio | | Relative Light-Emission Luminance | | Maintenance Factor of Light-Emission Luminance (%) |
|---|---|---|---|---|---|---|---|---|---|
| | Ti | Zr | Hf | Total | Rat. Est. I | Rat. Est. II | Initial Phase | After 100-hr. | |
| C. 1 | — | — | — | — | 1.0 | 1.2 | 100 | 74 | 74.0 |
| P. 68 | 0.0005 | 0.0005 | — | 0.001 | 1.5 | 1.7 | 97 | 82 | 84.5 |
| P. 69 | — | 0.0005 | 0.0005 | 0.001 | 1.5 | 1.7 | 98 | 84 | 85.7 |
| P. 70 | 0.0005 | — | 0.0005 | 0.001 | 1.5 | 1.7 | 96 | 85 | 88.5 |
| P. 71 | 0.0005 | 0.0002 | 0.0003 | 0.001 | 1.5 | 1.7 | 95 | 85 | 89.5 |
| P. 72 | 0.003 | 0.002 | — | 0.005 | 1.5 | 1.7 | 98 | 88 | 89.8 |
| P. 73 | — | 0.002 | 0.003 | 0.005 | 1.5 | 1.7 | 96 | 86 | 89.6 |
| P. 74 | 0.003 | — | 0.002 | 0.005 | 1.5 | 1.7 | 95 | 85 | 89.5 |
| P. 75 | 0.002 | 0.001 | 0.002 | 0.005 | 1.5 | 1.7 | 94 | 85 | 90.4 |

In the confirmatory study, the samples (Practical Examples 1 to 75) were prepared by changing types of the additive elements and their amounts, as shown in Tables 1 to 3. In addition, a conventional G phosphor, in which none of Ti, Zr, Hf, Mo and W was added, was prepared as Comparative Example 1. Note that "Amount of Addition" and "Analytical Value of Surface Region Zn—Si Ratio" in Tables 1 to 3 were individually obtained by the following methods.

For measuring the addition amount of the additive elements, inductively coupled plasma-atomic emission spectrometry (ICP-AES) can be used. When samples that have been dissolved by acid or alkali are sprayed in plasma, elements present in the solution are excited while being atomized at the same time, and thereby emit light specific to individual elements when transferring to a lower energy level. The ICP-AES is capable of determining a composition ratio of each sample by measuring a wavelength of the light specific to each element and an intensity of the light.

Note that methods for measuring a composition ratio of the entire phosphor particles include a titration method, inductively coupled plasma-mass spectrometry, and X-ray fluorescence analysis, and any of these methods can be used.

In the above embodiment, the ratio of the number of zinc atoms to that of silicon atoms at the surface region of the phosphor particles (i.e. the surface region Zn—Si ratio) is of extreme importance. The measurement of the surface region Zn—Si ratio can be implemented by the XPS as described above. Note that, in the confirmatory study, relative sensitivity factors of the 2p orbital of a silicon atom, the 2p3 orbital of a zinc atom, and the 3p orbital of a zinc atom are 0.368, 2.768, and 1.029, respectively. The relative ratios of the number of atoms were calculated by dividing the photoelectron peak areas by these factor values, individually.

1.7.1 Samples

PRACTICAL EXAMPLES 1-8

As shown in Table 1, Practical Examples 1-8 were prepared by changing the addition amount of Ti in the range of 0.00005 to 0.02 mol per 1 mol of the phosphor main portion ($Zn_{1.9}SiO_4Mn_{0.1}$). As to Practical Examples 1-8, the surface region Zn—Si ratios in Ratio Estimations I and II were adjusted to "1.0" and "1.2", respectively.

PRACTICAL EXAMPLES 9-16

For Practical Examples 9-16, Zr was added to the phosphor main portion ($Zn_{1.9}SiO_4Mn_{0.1}$). Here, the addition amount of Zr was changed in the range of 0.00005 to 0.02 mol per 1 mol of the phosphor main portion ($Zn_{1.9}SiO_4Mn_{0.1}$), as in the case of the above Practical Examples 1-8. The surface region Zn—Si ratios were the same in Practical Examples 1-8.

When Zr is added to the phosphor, it is only necessary to use $ZrO_2$ being a source of Zr, in place of $TiO_2$, in the method for manufacturing the G phosphor 250G according to the present embodiment.

PRACTICAL EXAMPLES 17-24

For Practical Examples 17-24, Hf was added to the phosphor main portion ($Zn_{1.9}SiO_4Mn_{0.1}$). Here, the addition amount of Hf was changed in the range of 0.00005 to 0.02 mol per 1 mol of the phosphor main portion ($Zn_{1.9}SiO_4Mn_{0.1}$), in the same manner as Ti of Practical Examples 1-8 and Zr of Practical Examples 9-16. The surface region Zn—Si ratios were the same in Practical Examples 1-8 and 9-16.

When Hf is added to the phosphor main portion, it is only necessary to use $HfO_2$ being a source of HF, in place of $TiO_2$, in the method for manufacturing the G phosphor 250G according to the present embodiment.

PRACTICAL EXAMPLES 25-40

For Practical Examples 25-45, at least two out of elements of Ti, Zr, and Hf were selected and added to the phosphor main portion ($Zn_{1.9}SiO_4Mn_{0.1}$). As shown in Table 1, the elements were added so that the total amount of the elements per 1 mol of the phosphor main portion became 0.0001 mol for Practical Examples 25-28; 0.0005 mol for Practical Examples 29-32; 0.001 mol for Practical Examples 33-36; and 0.005 mol for Practical Examples 37-40.

In addition, for Practical Examples 25-40, the surface region Zn—Si ratios in Ratio Estimations I and II were "1.0" and "1.2", respectively.

PRACTICAL EXAMPLES 41-67

As shown in Table 2, for Practical Examples 41-67, any one of the elements, Ti, Zr, and Hf, was selected and added to the phosphor main portion ($Zn_{1.9}SiO_4Mn_{0.1}$). The added amount of an element for each practical example is as shown in Table 2, and the surface region Zn—Si ratios were changed among: Practical Examples 41-46; Practical Examples 47-58; Practical Examples 59-64; and Practical Examples 65-67. To be more specific, the surface region Zn—Si ratios in Ratio Estimations I and II were "1.2" and "1.4", respectively, in Practical Examples 41-46; "1.5" and "1.7", respectively, in Practical Examples 47-58; "1.7" and "2.0", respectively, in Practical Examples 59-64; and "1.9" and "2.2", respectively, in Practical Examples 65-67.

Note that, for Practical Examples 41-67, in Substep S31 of the application of heat in the baking step S3 shown in FIG. 2, the surface region Zn—Si ratios were adjusted by accordingly conditioning the amount of the compressed air supplied in the range between 0 to 1 liter per minute at the same time of placing an adequate amount of ZnO in the tubular incineration. To be more specific, in order to make the surface region Zn—Si ratios larger, ZnO powder (the same raw material as a sample) was placed on another alumina board, and was treated with heat together with the alumina board having the mixed powder loaded thereon. At this point, especially in Substep S31 of the heat application and Substep S32 of maintaining the maximum temperature in the baking temperature schedule, the processing was implemented by reducing the amount of the compressed air being supplied. Thus, adequately adjusting the amount of the compressed air being supplied enables manufacturing of phosphors having desired surface region Zn—Si ratios as shown in Table 2. Note that methods for adjusting the surface region Zn—Si ratios are not limited to this, and various other methods can be employed.

PRACTICAL EXAMPLES 68-75

As shown in Table 3, for Practical Examples 68-75, at least two out of elements of Ti, Zr, and Hf were selected and added to the phosphor main portion ($Zn_{1.9}SiO_4Mn_{0.1}$), as in the case of Practical Examples 25-40. The elements were added so that the total amount of the elements per 1 mol of the phosphor main portion became 0.001 mol for Practical Examples 68-71; and 0.005 mol for Practical Examples 72-75.

The surface region Zn—Si ratios in Ratio Estimations I and II were "1.5" and "1.7", respectively, in Practical Examples 68-75.

COMPARATIVE EXAMPLE 1

As shown in Tables 1-3, for Comparative Example 1, none of Ti, Zr, and Hf was added while the surface region Zn—Si ratios being adjusted to "1.0" and "1.2" in Ratio Estimations I and II, respectively.

1.7.2 Method for Assessing Phosphor Performance

The following performance assessment was conducted on the above Practical Examples 1-75 and Comparative Example 1.

In order to assess the performance of the phosphor in the confirmatory study, vacuum ultraviolet light (VUV) with a wavelength of 146 nm was radiated to the respective phosphors of Practical Examples 1-75 and Comparative Example 1 to thereby excite them, and the light-emission luminance at this point was measured for each of the phosphors. The result of each sample phosphor can be found in its corresponding row in Tables 1-3. To be more specific, relative light-emission luminances are listed in Tables 1-3, expressed in percentage when the luminance of the phosphor of Comparative Example 1 is 100.

For assessment, the relative light-emission luminances were measured at two different time points with respect to each sample phosphor: after the baking process (referred to as "Initial Phase" in Tables 1-3); and after continuous irradiation with VUV in 100 hours ("After 100-hr" in Tables 1-3). The ratio of the relative light-emission luminance obtained "After 100-hr" to the relative light-emission luminance obtained in the "Initial Phase" was calculated and assessed with respect to each sample phosphor. These ratios are shown as "light-emission luminance maintenance factors" in Tables 1-3, which are expressed in percentage.

In the above method for assessing the phosphor performance, the light-emission luminance maintenance factor of Comparative Example 1 was 74%. Regarding a light-emission luminance maintenance factor, it is acceptable when the factor reaches at least 74%, which is the light-emission luminance maintenance factor of Comparative Example 1. It is more preferable when it reaches 80% or more. As to a relative light-emission luminance in the initial phase, it is acceptable when the value is 85% or more of that of Comparative Example 1, and more preferably 90% or more.

1.7.3 Considerations

As shown in Table 1, all phosphor samples of Practical Examples 1-8 exhibited higher light-emission luminance maintenance factors as compared to Comparative Example 1. Specifically speaking, the light-emission luminance maintenance factors of Practical Examples 1-8 were in the range of 76.0% to 91.2%, being 2.0 points to 17.2 points higher as compared to Comparative Example of 74.0%. In particular, the light-emission luminance maintenance factors for Practical Examples 3-9 were 80% or more.

Regarding all Practical Examples 1-8, the relative light-emission luminances in the initial phase were more than 85% of the luminance of Comparative Example 1. In particular, the relative light-emission luminances of Practical Examples 1-7 were 90% or more, and furthermore those of Practical Examples 1-6 were 95% or more.

It can be seen based on the above results that Practical Examples 1-8 have significant reduction effects on the time-lapse degradation and they are adequately acceptable from the aspect of relative light-emission luminances in the initial phase. Accordingly, the addition amount of Ti is preferably in the range of 0.0001 to 0.01 mol, and more preferably in the range of 0.0005 to 0.005 mol.

Next, as shown in Table 1, all phosphor samples of Practical Examples 9-16 exhibited high light-emission luminance maintenance factors as compared with Comparative Example 1. Also, as to the relative light-emission luminances in the initial phase, all Practical Examples 9-16 showed 89% to 100% of the light-emission luminance of Comparative Example 1. According to these results, it can be seen that Practical Examples 9-16 have higher reduction effects on the time-lapse degradation as compared to Comparative Example 1 and they are adequately acceptable from the aspect of relative light-emission luminances in the initial phase. In particular, since the relative light-emission luminances in the initial phase of Practical Examples 10-15 were 90% or more as compared to Comparative Example 1, the addition amount of Zr is preferably in the range of 0.0001 to 0.01 mol.

In addition, in Practical Examples 11-13, the light-emission luminance maintenance factors were 80% or more and the relative light-emission luminances in the initial phase were 95% or more. Accordingly, it is particularly desirable to set the addition amount of Zr in the range of 0.0005 to 0.002 mol.

The results show that Practical Examples 17-24 also exhibited higher light-emission luminance maintenance factors compared to Comparative Example 1, in which no Hf was added. Herewith, it is judged that Practical Examples 17-24 have significant reduction effects on the time-lapse degradation. Especially with Practical Examples 17-21, the relative light-emission luminances in the initial phase reached 90% or more as compared to Comparative Example 1, and from this aspect also, Practical Examples 17-21 are judged to have sufficient performance. It is considered that the addition amount of Hf is preferably in the range of 0.00005 to 0.002 mol as a result of comparison of Practical Examples 17-24 against Comparative Example 1.

Furthermore, the light-emission luminance maintenance factors of Practical Examples 19 and 20 were 80% or more, and their relative light-emission luminances in the initial phase were 95% or more. Herewith, it can be seen that a further preferable addition amount of Hf is in the range of 0.0005 to 0.001 mol.

Next, as shown in the lower half of Table 1, Practical Examples 25-40 exhibited higher light-emission luminance maintenance factors as compared to Comparative Example 1, in which the above elements were not added, regardless of the amounts of element addition (0.0001 to 0.005 mol in total). Accordingly, it is considered that all the Practical Examples 25 to 40 have significant reduction effects on the time-lapse degradation.

Thus, only one of Ti, Zr, and Hf may be added to the phosphor main portion, as is the case of Practical Examples 1-24, however, it can be seen that combining and adding at least two of the elements accomplishes high reduction effects on the time-lapse degradation as in Practical Examples 25-40. In addition, when multiple elements were combined and added together, the relative light-emission luminances in the initial phase reached 90% or more, and the light-emission luminance maintenance factors after "100-hr" reached 80% or more. Consequently, for the ZSM phosphor, it is more desirable that the total amount of elements selected from the above elements be added together in the range of 0.0005 to 0.005 mol.

Next, since the surface region Zn—Si ratios of Practical Examples 41-67 were adjusted within the range of 1.2 to 1.9 in Ratio Estimation I and within the range of 1.4 to 2.2 in Ratio Estimation II, respectively, as shown in Table 2, their relative light-emission luminance maintenance factors were improved as compared to Comparative Example 1, in which no additive elements were included. As a result, it is considered that the phosphors, each having a surface region Zn—Si ratio in the range of. 1.2 to 1.9 in Ratio Estimation I, also have reduction effects on the time-lapse degradation, as in the previously described practical examples.

The following describes, with the aid of FIG. 4, the relationship among the surface region Zn—Si ratio, relative light-emission luminance in the initial phase, and light-emission luminance maintenance factor of when 0.01 mol of Ti was added per 1 mol of the phosphor main portion $(Zn_{1.9}SiO_4Mn_{0.1})$ FIG. 4 plots relative light-emission luminances and light-emission luminance maintenance factors of Practical Example 4 in Table 1 as well as Practical Examples 41, 48, 59, and 65 in Table 2.

As shown in FIG. 4, when samples had a surface region Zn—Si ratio of 1.5 or more in Ratio Estimation I (1.7 or more in Ratio Estimation II), i.e. Practical Examples 48, 59, and 65, the light-emission luminance maintenance factors (after 100 hours) were higher as compared with Practical Examples 4 and 41. Thus, it can be seen that Practical Examples 48, 59, and 65 have especially high reduction effects on the time-lapse degradation.

FIG. 4 also plots samples whose addition ratio of Ti was 0.005 mol to 1 mol of the phosphor main portion $(Zn_{1.9}SiO_4Mn_{0.1})$, i.e. Practical Examples 6, 42, 49, and 60.

As in the case of the addition ratio of 0.001 mol, Practical Examples 49 and 60, having a surface region Zn—Si ratio of 1.5 or more in Ratio Estimation I, exhibited high relative light-emission luminances as well as high light-emission luminance maintenance factors.

Although a graphic representation is not given, samples where Zr, Hf, and the like were added exhibited high light-emission luminances in the initial phase as well as high light-emission luminance maintenance factors in the case when the surface region Zn—Si ratios in Ratio Estimations I and II were 1.5 or more and 1.7 or more, respectively, which can be seen by referring to Tables 1 and 2.

According to FIG. 4, it can be determined that the surface region Zn—Si ratios in Ratio Estimations I and II should preferably be 1.5 or more and 1.7 or more, respectively, when Ti, Zr, Hf, and the like are added to the phosphor main portion ($Zn_{1.9}SiO_4Mn_{0.1}$), from the aspect of the relative light-emission luminances in the initial phase as well as the light-emission luminance maintenance factors.

Next, Practical Examples 68-75 exhibited, in either case of the amounts of element addition (total amounts: 0.001 mol and 0.005 mol), higher relative light-emission luminance maintenance factors as compared to Comparative Example 1, in which no additive elements were included, as shown in Table 3. According to these results, it is determined that high reduction effects on the time-lapse degradation can also be achieved when two or all the three out of Ti, Zr, and Hf are selected and added to the phosphor main portion ($Zn_{1.9}SiO_4Mn_{0.1}$)

As a result of considering the data in Tables 1-3 comprehensively, it is desirable to form the G phosphor 250G so as to have the following structure.

Regarding the composition of the G phosphor 250G, it is preferable that at least one element from among Ti, Zr, and Hf be selected and added to the phosphor main portion ($Zn_{1.9}SiO_4Mn_{0.1}$). Additionally, the total addition ratio of the elements (Ti, Zr, Hf) per 1 mol of the phosphor main portion ($Zn_{1.9}SiO_4Mn_{0.1}$) should preferably in the range of 0.0001 mol to 0.01 mol, and more preferably 0.0005 mol to 0.005 mol. The surface region Zn—Si ratios in Ratio Estimations I and II should preferably be 1.5 and 1.7, respectively.

1.7.4 Confirmation of Advantageous Effects in PDP

Advantageous effects of the G phosphor of the present embodiment used in a PDP is described next, with the aide of FIG. 5. A PDP using the G phosphor of the above, Comparative Example 1 and a PDP using the phosphor of Practical Example 65-implemented a fixed display of only a green color. FIG. 5 plots changes in the light-emission luminance maintenance factors against the operating time (the elapsed time for display). Note that the light-emission luminance maintenance factor in FIG. 5 is expressed in percentage when the relative luminance of each PDP at the start of illumination is "100".

Methods for manufacturing the individual PDPs used for the confirmatory study were, for example, as follows.

In the manufacture of the PDP using the practical example's phosphor, 30 wt % G phosphor (average particle diameter: 2 μm) of Practical Example 65, 4.5 wt % ethylcellulose (molecular weight: approximately 200,000), and 65.5 wt % butylcarbitol acetate as a solvent medium were mixed and kneaded by a roll mill of three rollers to obtain phosphor ink having a viscosity of 2.0 to 6.0 Pa·s (i.e. 2000 to 6000 cps). The G phosphor layer 25G was formed by applying a heat treatment at 500° C. for 10 minutes after the phosphor ink was applied to between the barrier ribs 24 and dried by using the meniscus method.

The ingredients of the phosphor ink are not limited to the above. In addition, another ink application method may be used (e.g. screen printing and line jetting processes).

The G phosphor layer 25G of the PDP using the practical example's phosphor was structured by the above-described method while the rest of the PDP was formed by a conventional method.

On the other hand, the phosphor of the above Comparative Example 1, namely a Mn-activated zinc silicate phosphor including none of Ti, Zr, and Hf and having a surface region Zn—Si ratio of 1.0 in Ratio Estimation I (1.2 in Ratio Estimation II), was used for the PDP using the comparative example's phosphor.

As shown in FIG. 5, regarding the PDP using the comparative example's phosphor, the light-emission luminance maintenance factor decreased to about 82% and 79% at elapsed times of 3000 hours and 6000 hours, respectively. On the other hand, the PDP using the practical example's phosphor maintained the light-emission luminance maintenance factor at about 93% and 91% at elapsed times of 3000 hours and 6000 hours, respectively.

Thus, the PDP 1 having the G phosphor 250G of the present embodiment is capable of reducing the time-lapse luminance degradation as compared with the PDP using the comparative example's G phosphor having none of Ti, Zr, and Hf added therein. Accordingly, burn-in problems due to a decline in light-emission luminance can be reduced in a reliable manner.

2. Second Embodiment

The following describes a PDP according to a second embodiment. Note however the PDP of the second embodiment only differs from the PDP 1 of the first embodiment in the composition of the G phosphor structuring the G phosphor layer, and therefore the following explanation focuses attention on the G phosphor composition of the present embodiment.

2.1 Composition of G Phosphor

As to the PDP according to the second embodiment, a material having the following composition is used for the G phosphor structuring the G phosphor layer.

G phosphor—$Zn_{1.9}SiO_4:0.1Mn:0.0005W$

Namely, the G phosphor of the second embodiment has tungsten (W) as an additive element α. The addition ratio of W is, as shown in the above composition formula, in the range of 0.00005 mol to 0.01 mol per 1 mol of the phosphor main portion ($Zn_{1.9}SiO_4Mn_{0.1}$). The addition ratio of W per 1 mol of  is more preferably in the range of 0.0001 mol to 0.005 mol, or from 0.00005 mol to 0.0005 mol.

Regarding the G phosphor of the second embodiment also, the ratios of the number of zinc atoms (Zn) to that of silicate atoms (Si) at the surface region of the particles (i.e. surface region Zn—Si ratios) in Ratio Estimations I and II are set to 1.5 or more and 1.7 or more, respectively.

2.2 Advantageous Effects of G Phosphor and PDP

As described above, as to the G phosphor of the present embodiment, W is added to the phosphor main portion ($Zn_{1.9}SiO_4Mn_{0.1}$) in the above ratio, which results in less silicon (Si) segregation in the particle surface region (e.g. a region up to 4 nm deep from the particle surface) and therefore leads to high crystallinity.

In addition, the G phosphor of the present embodiment is, as with the case of the G phosphor 250G of the first embodiment, less likely to cause the time-lapse degradation during operation and is capable of maintaining a high luminous efficiency regardless of duration of the operating time.

In the present embodiment, it is possible to achieve compatibility between a high luminous efficiency and a degradation resistance characteristic by setting the addition ratio of Mo in the G phosphor to be in the above range. In addition, since the surface region Zn—Si ratios in Ratio Estimations I and II are set to 1.5 or more and 1.7 or more, respectively, the G phosphor of the present embodiment is further effective for reducing the time-lapse degradation. Herewith, a PDP having a G phosphor layer formed with the G phosphor is less likely to cause the time-lapse degradation of the G phosphor layer 25G during operation, and is capable of maintaining a high luminous efficiency and exhibiting high image quality.

Regarding the G phosphor of the present embodiment, when a Mo content is increased, the luminous efficiency tends to decline although the resistance characteristic against degradation is improved, and therefore an adequate amount of Mo needs to be contained.

2.3 Method for Manufacturing G Phosphor

The method for manufacturing the G phosphor of the present embodiment differs from that of the first embodiment in using Mo oxide, instead of Ti oxide, for the raw materials used in the material mixing process. Namely, the following raw materials are used for manufacturing the G phosphor of the present embodiment, for example.

$MnCO_3$ (e.g. produced by Kojundo Chemical Laboratory Co., Ltd.): 0.10 mol (1.076 g);

ZnO (e.g. produced by Kojundo Chemical Laboratory Co., Ltd.): 1.90 mol (13.636 g);

$SiO_2$ (e.g. produced by Kojundo Chemical Laboratory Co., Ltd.): 1.00 mol (5.298 g); and $MoO_3$ (e.g. produced by Kojundo Chemical Laboratory Co., Ltd.): 0.0005 mol (0.006 g).

Other processes included in the manufacturing method can be the same in the first embodiment, and therefore the descriptions are omitted.

2.4 Variations of Additive Element α in G Phosphor

In the second embodiment, Mo is adopted as an example of the additive elements for the phosphor main portion ($Zn_{1.9}SiO_4Mn_{0.1}$), however molybdenum (Mo) or a combination of Mo and W may be used instead. When such an element is adopted, it is still the case that the addition ratio should desirably be in the range of 0.00005 mol to 0.01 mol per 1 mole of the phosphor main portion ($Zn_{1.9}SiO_4Mn_{0.1}$), and more preferably in the range of 0.0001 mol to 0.005 mol, or the range of 0.00005 mol to 0.0005 mol. For example, the following compositions may be adopted.

$Zn_{1.9}SiO_4Mn_{0.1}$:0.0005Ti:0.0005Mo $Zn_{1.9}SiO_4Mn_{0.1}$:0.0005Zr:0.0005Mo:0.0005W

Note that different variations other than these may be adopted.

2.5 Confirmation of Advantageous Effects

Figure 6:
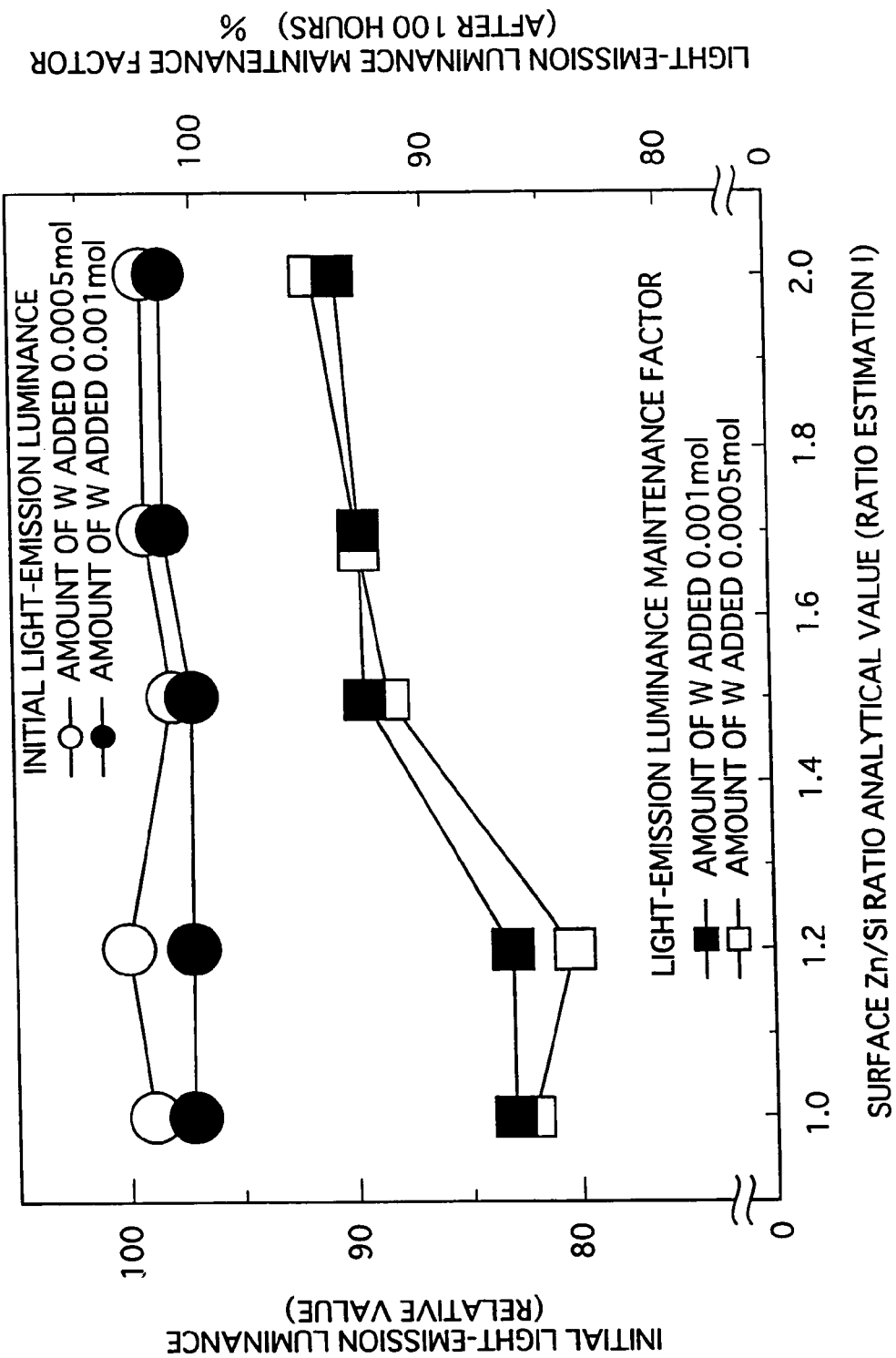
FIG. 6 is a characteristic diagram showing relationships among a surface region Zn—Si ratio analytical value, an initial light-emission luminance, and a light-emission luminance maintenance factor, regarding phosphors of a practical and a comparative examples.
Figure 7:
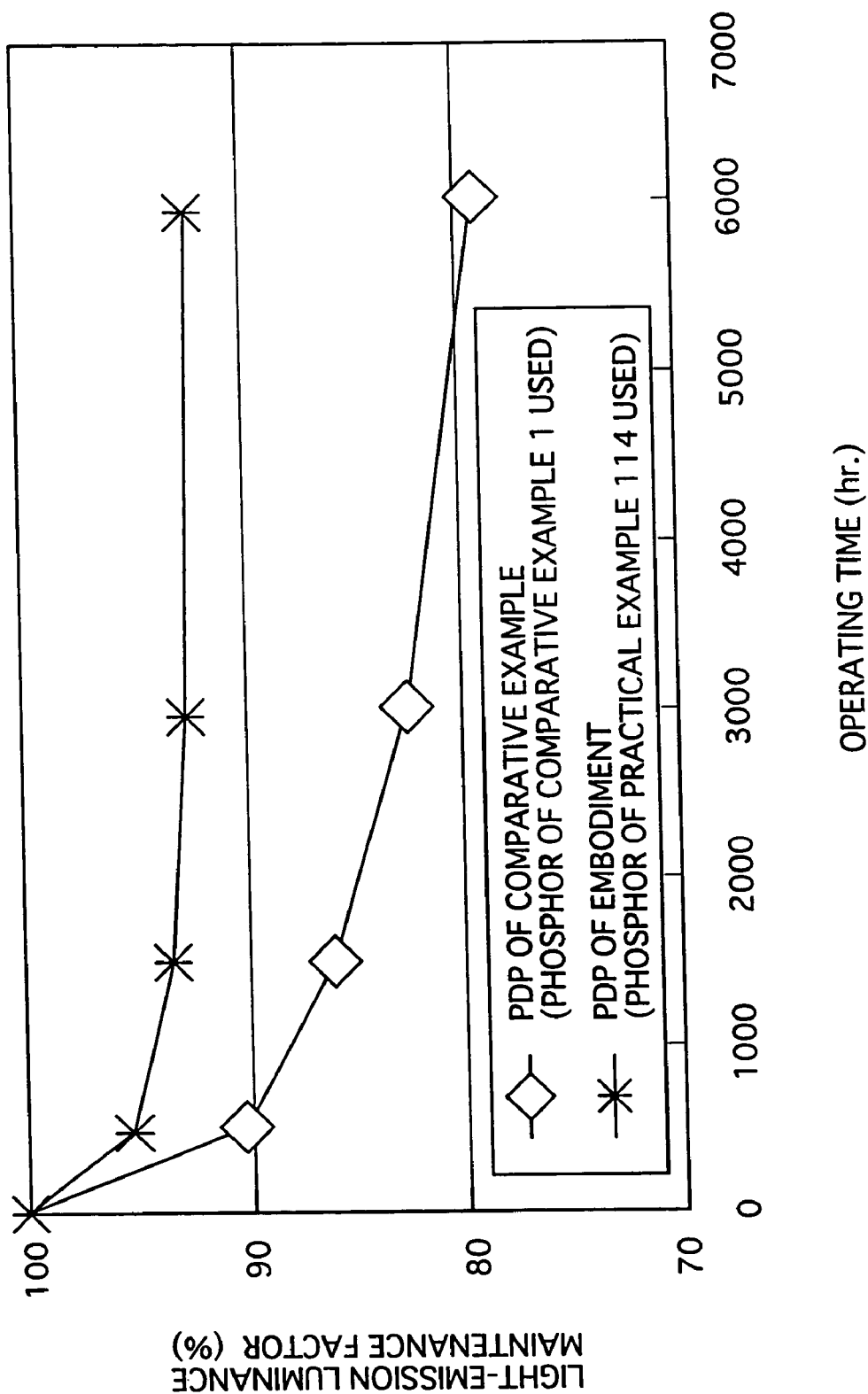
FIG. 7 is a characteristic diagram showing relationships between operating time and a light-emission luminance maintenance factor, regarding a PDP using another practical example's phosphor and a PDP using a comparative example.

The following describes results of the confirmatory study conducted on the above-mentioned advantageous effects of the G phosphor and the PDP having the G phosphor according to the present embodiment, with the aid of Tables 4 to 6 as well as FIGS. 6 and 7. The compositions of the samples used in the study are shown in Tables 4 to 6.

TABLE 4

| | Additive Elements and Amount of Addition (mol) | | | Analytical Value of Surface Region Zn—Si Ratio | | Relative Light-Emission Luminance | | Maintenance Factor of Light-Emission Luminance |
|---|---|---|---|---|---|---|---|---|
| | W | Mo | Total | Rat. Est. I | Rat. Est. II | Initial Phase | After 100-hr. | (%) |
| C. 1 | — | — | — | 1.0 | 1.2 | 100 | 74 | 74.0 |
| P. 76 | 0.00003 | — | 0.00003 | 1.0 | 1.2 | 100 | 78 | 78.0 |
| P. 77 | 0.00005 | — | 0.00005 | 1.0 | 1.2 | 100 | 81 | 81.0 |
| P. 78 | 0.0001 | — | 0.0001 | 1.0 | 1.2 | 99 | 81 | 81.8 |
| P. 79 | 0.0005 | — | 0.0005 | 1.0 | 1.2 | 99 | 85 | 85.9 |
| P. 80 | 0.001 | — | 0.001 | 1.0 | 1.2 | 97 | 84 | 86.6 |
| P. 81 | 0.003 | — | 0.003 | 1.0 | 1.2 | 96 | 82 | 85.4 |
| P. 82 | 0.005 | — | 0.005 | 1.0 | 1.2 | 95 | 82 | 86.3 |
| P. 83 | 0.01 | — | 0.01 | 1.0 | 1.2 | 92 | 80 | 87.0 |
| P. 84 | — | 0.00003 | 0.00003 | 1.0 | 1.2 | 100 | 77 | 77.0 |
| P. 85 | — | 0.00005 | 0.00005 | 1.0 | 1.2 | 101 | 81 | 80.2 |
| P. 86 | — | 0.0001 | 0.0001 | 1.0 | 1.2 | 99 | 81 | 81.8 |
| P. 87 | — | 0.0005 | 0.0005 | 1.0 | 1.2 | 98 | 82 | 83.7 |
| P. 88 | — | 0.001 | 0.001 | 1.0 | 1.2 | 97 | 83 | 85.6 |
| P. 89 | — | 0.003 | 0.003 | 1.0 | 1.2 | 97 | 83 | 85.6 |
| P. 90 | — | 0.005 | 0.005 | 1.0 | 1.2 | 95 | 81 | 85.3 |
| P. 91 | — | 0.007 | 0.007 | 1.0 | 1.2 | 93 | 80 | 86.0 |
| P. 92 | — | 0.01 | 0.01 | 1.0 | 1.2 | 90 | 77 | 85.6 |
| P. 93 | 0.00003 | 0.00002 | 0.00005 | 1.0 | 1.2 | 100 | 80 | 80.0 |
| P. 94 | 0.0003 | 0.0004 | 0.0007 | 1.0 | 1.2 | 98 | 83 | 84.7 |
| P. 95 | 0.0005 | 0.0005 | 0.001 | 1.0 | 1.2 | 96 | 84 | 87.5 |
| P. 96 | 0.005 | 0.005 | 0.01 | 1.0 | 1.2 | 91 | 78 | 85.7 |
| P. 97 | 0.01 | 0.01 | 0.02 | 1.0 | 1.2 | 88 | 77 | 87.5 |

TABLE 5

| Additive Elements and Amount of Addition (mol) | | | Analytical Value of Surface Region Zn—Si Ratio | | Relative Light-Emission Luminance | | Maintenance Factor of Light-Emission Luminance |
|---|---|---|---|---|---|---|---|
| W | Mo | Total | Rat. Est. I | Rat. Est. II | Initial Phase | After 100-hr. | (%) |
| C. 1 | — | — | — | 1.0 | 1.2 | 100 | 74 | 74.0 |
| P. 98 | 0.0005 | — | 0.0005 | 1.2 | 1.4 | 100 | 84 | 84.0 |
| P. 99 | 0.001 | — | 0.001 | 1.2 | 1.4 | 97 | 84 | 86.6 |
| P. 100 | — | 0.0005 | 0.0005 | 1.2 | 1.4 | 99 | 82 | 82.8 |
| P. 101 | — | 0.001 | 0.001 | 1.2 | 1.4 | 97 | 82 | 84.5 |
| P. 102 | 0.00005 | — | 0.00005 | 1.5 | 1.7 | 100 | 82 | 82.0 |
| P. 103 | 0.0005 | — | 0.0005 | 1.5 | 1.7 | 98 | 90 | 91.8 |
| P. 104 | 0.001 | — | 0.001 | 1.5 | 1.7 | 97 | 90 | 92.8 |
| P. 105 | 0.005 | — | 0.005 | 1.5 | 1.7 | 96 | 88 | 91.7 |
| P. 106 | — | 0.00005 | 0.00005 | 1.5 | 1.7 | 101 | 88 | 87.1 |
| P. 107 | — | 0.0005 | 0.0005 | 1.5 | 1.7 | 99 | 88 | 88.9 |
| P. 108 | — | 0.001 | 0.001 | 1.5 | 1.7 | 98 | 88 | 89.8 |
| P. 109 | — | 0.005 | 0.005 | 1.5 | 1.7 | 95 | 86 | 90.5 |
| P. 110 | 0.0005 | — | 0.0005 | 1.7 | 2.0 | 99 | 92 | 92.9 |
| P. 111 | 0.001 | — | 0.001 | 1.7 | 2.0 | 98 | 91 | 92.9 |
| P. 112 | — | 0.0005 | 0.0005 | 1.7 | 2.0 | 99 | 89 | 89.9 |
| P. 113 | — | 0.001 | 0.001 | 1.7 | 2.0 | 99 | 88 | 88.9 |
| P. 114 | 0.0005 | — | 0.0005 | 2.0 | 2.3 | 99 | 94 | 94.9 |
| P. 115 | 0.001 | — | 0.001 | 2.0 | 2.3 | 98 | 92 | 93.9 |
| P. 116 | — | 0.0005 | 0.0005 | 2.0 | 2.3 | 100 | 89 | 89.0 |
| P. 117 | — | 0.001 | 0.001 | 2.0 | 2.3 | 99 | 89 | 89.9 |

TABLE 6

| Additive Elements and Amount of Addition (mol) | | | Analytical Value of Surface Region Zn—Si Ratio | | Relative Light-Emission Luminance | | Maintenance Factor of Light-Emission Luminance |
|---|---|---|---|---|---|---|---|
| W | Mo | Total | Rat. Est. I | Rat. Est. II | Initial Phase | After 100-hr. | (%) |
| C. 1 | — | — | — | 1.0 | 1.2 | 100 | 74 | 74.0 |
| P. 118 | 0.0003 | 0.0004 | 0.0007 | 1.5 | 1.7 | 99 | 89 | 89.9 |
| P. 119 | 0.0005 | 0.0005 | 0.001 | 1.5 | 1.7 | 98 | 88 | 89.8 |

In the confirmatory study, samples (Practical Examples 76 to 119) were prepared by changing types of the additive elements and their amounts, as shown in Tables 4 to 6. In addition, a conventional G phosphor, in which none of Ti, Zr, Hf, Mo and W was added, was prepared as Comparative Example 1, as in the above first embodiment. Note that "Amount of Addition" and "Analytical Value of Surface Region Zn—Si Ratio" in Tables 4 to 6 are the same as above, and therefore the descriptions are omitted.

2.5.1 Samples

PRACTICAL EXAMPLES 76-83

As shown in Table 4, Practical Examples 76-83 were prepared by changing the addition amount of W in the range of 0.00003 to 0.01 mol per 1 mol of the phosphor main portion ($Zn_{1.9}SiO_4Mn_{0.1}$). As to Practical Examples 76-83, the surface region Zn—Si ratios in Ratio Estimations I and II were adjusted to "1.0" and "1.2", respectively.

PRACTICAL EXAMPLES 84-92

For Practical Examples 84-92, Mo was added to the phosphor main portion ($Zn_{1.9}SiO_4Mn_{0.1}$). Here, the addition amounts of Mo for Practical Examples 84-92 were the same for Practical Examples 76-83, i.e. being changed in the range of 0.00003 to 0.01 mol per 1 mol of the phosphor main portion ($Zn_{1.9}SiO_4Mn_{0.1}$). The surface region Zn—Si ratios were also the same for Practical Examples 76-83.

PRACTICAL EXAMPLES 93-97

For Practical Examples 93-97, Mo and W were added together to the phosphor main portion ($Zn_{1.9}SiO_4Mn_{0.1}$). As shown in Table 4, the elements were added so that the total amounts of the elements per 1 mol of the phosphor main portion became in the range of 0.00005 to 0.02 mol.

In addition, for Practical Examples 93-97, the surface region Zn—Si ratios in Ratio Estimations I and II were also set to "1.0" and "1.2", respectively.

PRACTICAL EXAMPLES 98-117

As shown in Table 5, for Practical Examples 98-117, either one of the elements, Mo and W, was added to the phosphor main portion ($Zn_{1.9}SiO_4Mn_{0.1}$). The addition amount of an element for each practical example is as shown in Table 5, and the surface region Zn—Si ratios were changed among: Practical Examples 98-101; Practical Examples 102-109; Practical Examples 110-113; and Practical Examples 114-117. To be more specific, the surface region Zn—Si ratios in Ratio Estimations I and II were set to "1.2" and "1.4", respectively, in Practical Examples 98-101; "1.5" and "1.7", respectively, in Practical Examples 110-113; "1.7" and "2.0", respectively, in Practical Examples 114-117; and "2.0" and "2.3", respectively, in Practical Examples 114-117.

The method for adjusting the surface region Zn—Si ratios for each practical example is the same for Practical Examples 41-67 of the confirmatory study in the first embodiment. Note that, as to Practical Examples 98-117 of the confirmatory study in the present embodiment also, methods for adjusting the surface region Zn—Si ratios are not limited to the above-mentioned method, and various other methods can be employed.

PRACTICAL EXAMPLES 118 and 119

As shown in Table 6, for Practical Examples 118 and 119, both Mo and W were added to the phosphor main portion ($Zn_{1.9}SiO_4Mn_{0.1}$), as in the case of Practical Examples 93-97. The elements were added so that the total amounts of the elements per 1 mol of the phosphor main portion became 0.0007 mol for Practical Example 118 and 0.001 mol for Practical Example 119, respectively.

The surface region Zn—Si ratios in Ratio Estimations I and II were set to "1.5" and "1.7", respectively, in Practical Examples 118 and 119.

2.5.2 Method for Assessing Phosphor Performance

The performance assessment was conducted on each phosphor sample of Practical Examples 76 to 119 as well as Comparative Example 1 in the same fashion as the first embodiment. The results are shown in Tables 4 to 6.

As to the present embodiment in which at least one of the elements, Mo and W, was added to the phosphor main portion ($Zn_{1.9}SiO_4Mn_{0.1}$) also, it is acceptable when the light-emission luminance maintenance factor of the phosphor reaches at least 74%, which is the light-emission luminance maintenance factor of Comparative Example 1. It is more preferable when it reaches 80% or more. As to a relative light-emission luminance in the initial phase, it is acceptable when the value is 85% or more of that of Comparative Example 1, and more preferably 90% or more.

2.5.3 Considerations

As shown in Table 4, Practical Examples 76-83 where W was added to the phosphor main portion ($Zn_{1.9}SiO_4Mn_{0.1}$) exhibited higher light-emission luminance maintenance factors as compared to Comparative Example 1, regardless of the amounts of element addition (0.00003 to 0.01 mol). Accordingly, it is considered that the phosphors of Practical Examples 76-83 have significant reduction effects on the time-lapse degradation. In particular, the light-emission luminance maintenance factors for phosphors of Practical Examples 77-83 were 80% or more. Therefore, it is desirable that the addition amount of W be in the range of 0.00005 to 0.01 mol per 1 mol of the phosphor main portion ($Zn_{1.9}SiO_4Mn_{0.1}$)

In addition, the phosphors of Practical Examples 78-82 exhibited relative light-emission luminances in the initial phase of no less than 95% of the relative light-emission luminance of Comparative Example 1, and the light-emission luminance maintenance factors were 80% or more. Herewith, it is more desirable that the addition amount of W be in the range of 0.0001 to 0.005 mol per 1 mol of the phosphor main portion, as in the case of Practical Examples 78-82. The phosphors of Practical Examples 77 to 79 exhibited relative light-emission luminances in the initial phase of no less than 99% of the relative light-emission luminance of Comparative Example 1, and the light-emission luminance maintenance factors were 80% or more. Accordingly, it is more desirable that the addition amount of W be in the range of 0.00005 to 0.0005 mol per 1 mol of the phosphor main portion.

Practical Examples 84-92, in which Mo was added to the phosphor main-portion ($Zn_{1.9}SiO_4Mn_{0.1}$), exhibited higher light-emission luminance maintenance factors as compared to Comparative Example 1, regardless of the amounts of element addition (0.00003 to 0.01 mol). Accordingly, it is considered that the phosphors of Practical Examples 84-92 have significant reduction effects on the time-lapse degradation. In particular, the phosphors of Practical Examples 85-92 exhibited light-emission luminance maintenance factors of no less than 80%. Accordingly, it is desirable that the addition amount of Mo be in the range of 0.00005 to 0.01 mol per the phosphor main portion.

Furthermore, the phosphors of Practical Examples 86-90 exhibited relative light-emission luminances in the initial phase of no less than 95% and the light-emission luminance maintenance factors of no more less than 80%. Therefore, the addition amount of Mo is desirably in the range of 0.0001 to 0.005 mol per 1 mol of the phosphor main portion. In addition, each of the phosphors of Practical Examples 85-87 had a relative light-emission luminance in the initial phase of no less than 98% as compared to Comparative Example 1, and. a light-emission luminance maintenance factor of 80% or more. It is desirable that the addition amount of Mo be in the range of 0.00005 to 0.0005 mol per 1 mol of the phosphor main portion.

Next, as shown in Table 4, Practical Examples 93-97. exhibited higher light-emission luminance maintenance factors as compared to Comparative Example 1, regardless of the amounts of the element addition (0.00005 to 0.02 mol in total). According to the results, it is considered that the phosphors of Practical Examples 93 to 97 have significant reduction effects on the time-lapse degradation, and it is clear that both elements, Mo and W, can be combined and used as additive elements contained with the phosphor main portion ($Zn_{1.9}SiO_4Mn_{0.1}$)

Additionally, when Mo and W were combined and contained with the phosphor main portion, the relative light-emission luminances in the initial phase were 90% or more and the light-emission luminance maintenance factors were 80% or more. Therefore, in this case, it is desirable that the total amount of the additive elements be set in the range of 0.00005 to 0.01 mol per 1 mol of the phosphor main portion.

As shown in Table 5, all Practical Examples 98-117 exhibited better light-emission luminance maintenance factors when compared to Comparative Example 1, in which no additive was included. According to the results, it is considered that the phosphors of Practical Examples 98-117 have reduction effects on the time-lapse degradation, as with the above Practical Examples 76-97.

As shown in FIG. 5, in the case when the surface region Zn—Si ratio in Ratio Estimation I was 1.5 or more (in Ratio Estimation 2, 1.7 or more), the light-emission luminance maintenance factors (after 100 hours) became higher than other cases. Therefore, it can be said that the phosphors of Practical Examples 102-117 have especially high reduction effects on the time-lapse degradation.

As shown in Table 6, the phosphors of Practical Examples 118 and 119 exhibited, in either case of the amounts of element addition (total amounts: 0.0007 mol and 0.001 mol), higher relative light-emission luminance maintenance factors as compared to Comparative Example 1, in which no additive elements were included. According to the results, it is considered that the phosphors of Practical Examples 118 and 119 have higher reduction effects on the time-lapse degradation as compared to Comparative Example 1.

According to the results, by combining Mo and W, adding the combined result to the phosphor main portion, and adjusting the surface region Zn—Si ratios in Ratio Estimations I and II to "1.5" and to "1.7", respectively, it is possible to effectively reduce the time-lapse degradation of the phosphor.

2.5.4 Confirmation of Advantageous Effects in PDP

Advantageous effects of the G phosphor of the present embodiment used in a PDP is described next, with the aide of FIG. 7. A PDP using the G phosphor of the above Comparative Example 1 and a PDP using the phosphor of Practical Example 114 implemented a fixed display of only a green color. FIG. 7 plots changes in the light-emission luminance maintenance factors against the operating time (the elapsed time for display). Note that the light-emission luminance maintenance factor in FIG. 7 is expressed in percentage when the relative luminance of each PDP at the start of illumination is "100".

Methods for manufacturing the individual PDPs used for the confirmatory study are the same as those used in the above first embodiment, except for the composition of the G phosphor used.

As shown in FIG. 7, regarding the PDP using the comparative example's phosphor, the light-emission luminance maintenance factor decreased to about 82% and 79% at elapsed times of 3000 hours and 6000 hours, respectively. On the other hand, the PDP using the practical example's phosphor maintained the light-emission luminance maintenance factor at about 93% and 92% at elapsed times of 3000 hours and 6000 hours, respectively.

Thus, the PDP having the G phosphor of the present embodiment is capable of reducing time-lapse luminance degradation as compared with the PDP using comparative example's G phosphor having none of Ti, Zr, Hf, Mo, and W added therein. Accordingly, burn-in problems due to a decline in light-emission luminance can be reduced in a reliable manner.

3. Additional Particulars

The above first and second embodiments only provide examples of the present invention, and the present invention is not confined to these. For example, the first and second embodiments describe the cases in which the G phosphors of the present invention are applied to PDPs. However, the same effects can be achieved even when the present invention is applied to other uses such as a fluorescent lamp, for example. Note however that notable effects are found when the present invention is applied to a PDP having smaller discharge space compared to that of a fluorescent lamp and having generated ultraviolet radiation of a short wavelength.

Note that the compositions of the G phosphors of the above first and second embodiments need suitable adjustments according to characteristic values such as required chromaticity, luminous efficiency, resistance characteristic against degradation, decay characteristic, and the like. The present invention is not particularly limited to these characteristic values. However, as a specific example, if the amount of Si is slightly increased, the resistance characteristic against degradation is generally declined even though the luminescence property is improved.

Additionally, regarding the G phosphors of the above first and second embodiments, it is capable of adjusting the amount of Mn accordingly. Again, although the present invention is not particularly limited to this, the amount is generally set in the range of 0.01 mol to 0.2 mol, from a practical standpoint. If the amount of Mn is below the range, for example, the decay time of luminescence of the phosphor becomes longer. This will lead to a problem of the afterimage phenomenon when such a phosphor is applied to the use for image display, such as a PDP. On the other hand, if the amount of Mn is above the range, a decline in the luminous efficiency will be a problem.

In addition, PDPs with the barrier ribs 24 having a square lattice structure are adopted in the first and second embodiments. However, as a matter of course, the present invention can be applied to a PDP with barrier ribs in a stripe pattern or a PDP with barrier ribs having a meandering structure. In addition, although being applied to the alternate current PDPs in the above first and second embodiments, the present invention can be applied to direct current PDPs.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A phosphor comprising:
a phosphor main portion is in a particulate form containing zinc silicate as a base material and manganese as an activator; and
one or more additive elements selected from the group consisting of titanium, zirconium, and hafnium, being added to the phosphor main portion, wherein in a surface region of each particle, including a surface and a vicinity thereof, a ratio of a number of zinc atoms to a number of silicate atoms is 1.5 or more.

2. The phosphor of claim 1, wherein
the additive elements in total are added in a proportion from 0.0001 mol to 0.01 mol, inclusive, to 1 mol of the phosphor main portion.

3. The phosphor of claim 1, wherein
the additive elements in total are added in a proportion from 0.0005 mol to 0.005 mol, inclusive, to 1 mol of the phosphor main portion.

4. A phosphor comprising:
a phosphor main portion is in a particulate form containing zinc silicate as a base material and manganese as an activator; and
one or more additive elements selected from the group consisting of titanium, zirconium, and hafnium, being added to the phosphor main portion, wherein in a surface region of each particle, including a surface and a vicinity thereof, a ratio of a number of zinc atoms to a number of silicate atoms is 1.7 or more, wherein
the ratio of the number of atoms is 1.7 or more when defined as a ratio of (i) a relative number of zinc atoms in the surface region, calculated from a photoelectron peak area based on a 3 p orbital of a zinc atom to (ii) a relative number of silicon atoms in the surface region, calculated from a photoelectron peak area based on a 2 p orbital of a silicon atom.

5. A phosphor comprising:
a phosphor main portion containing zinc silicate as a base material and manganese as an activator; and
one or more additive elements selected from the group consisting of molybdenum and tungsten, being added to the phosphor main portion,
wherein the additive elements in total are added in a proportion from 0.00005 mol to 0.0005 mol, inclusive, to 1 mol of the phosphor main portion.

6. A phosphor being in particulate form, comprising:
a phosphor main portion containing zinc silicate as a base material and manganese as an activator; and
one or more additive elements selected from the group consisting of molybdenum and tungsten, being added to the phosphor main portion, wherein
in a surface region of each particle including a surface and a vicinity thereof, a ratio of a number of zinc atoms to a number of silicate atoms is 1.5 or more.

7. The phosphor of claim 6, wherein
the additive elements in total are added in a proportion from 0.00005 mol to 0.01 mol, inclusive, to 1 mol of the phosphor main portion.

8. The phosphor of claim 6, wherein
the additive elements in total are added in a proportion from 0.0001 mol to 0.005 mol, inclusive, to 1 mol of the phosphor main portion.

9. A plasma display panel comprising:
a pair of substrates placed opposite each other with a space therebetween; and
a phosphor layer formed on one of the pair of substrates and facing the space, wherein
at least part of the phosphor layer is formed with a phosphor in which at least one element of molybdenum and tungsten is added to a phosphor main portion containing zinc silicate as a base material and manganese as an activator.

10. The plasma display panel of claim 9, wherein
the element in total is added in a proportion from 0.00005 mol to 0.01 mol, inclusive, to 1 mol of the phosphor main portion.

11. The plasma display panel of claim 9, wherein
the phosphor is in particulate form, and each particle has a surface region including a surface and a vicinity thereof, and
in the surface region which is up to 4 nm deep from the surface, a ratio of a number of zinc atoms to a number of silicate atoms, obtained by X-ray photoelectron spectroscopy using AlKα X-ray radiation, is 1.5 or more when defined as a ratio of (i) a relative number of zinc atoms in the surface region, calculated from a photoelectron peak area based on a 2 p3 orbital of a zinc atom to (ii) a relative number of silicon atoms in the surface region, calculated from a photoelectron peak area based on a 2 p orbital of a silicon atom.

12. The plasma display panel of claim 9, wherein
the phosphor is in particulate form, and each particle has a surface region including a surface and a vicinity thereof, and
in the surface region which is up to 4 nm deep from the surface, a ratio of a number of zinc atoms to a number of silicate atoms, obtained by X-ray photoelectron spectroscopy using AlKα X-ray radiation, is 1.7 or more when defined as a ratio of (i) a relative number of zinc atoms in the surface region, calculated from a photoelectron peak area based on a 3 p orbital of a zinc atom to (ii) a relative number of silicon atoms in the surface region, calculated from a photoelectron peak area based on a 2 p orbital of a silicon atom.

13. A phosphor being in particulate form, comprising:
a phosphor main portion containing zinc silicate as a base material and manganese as an activator; and
one or more additive elements selected from the group consisting of molybdenum and tungsten, being added to the phosphor main portion,
wherein in a surface region of each particulate including a surface and a vicinity thereof, a ratio of a number of zinc atoms to a number of silicate atoms is 1.7 or more,
wherein the ratio is obtained by X-ray photoelectron spectroscopy using AlKα X-ray radiation, and
the ratio is 1.7 or more when defined as a ratio of (i) a relative number of zinc atoms in the surface region, calculated from a photoelectron peak area based on a 3 p orbital of a zinc atom to (ii) a relative number of silicon atoms in the surface region, calculated from a photoelectron peak area based on a 2 p orbital of a silicon atom.

14. A plasma display panel comprising:
a pair of substrates opposing each other with a space therebetween; and
a phosphor layer formed on one of the pair of substrates and facing the space, wherein
at least part of the phosphor layer is formed with a phosphor in which at least one element from among titanium, zirconium, and hafnium is added to a phosphor main portion containing zinc silicate as a base material and manganese as an activator, wherein
the phosphor is in particulate form, and each particle has a surface region including a surface and a vicinity thereof, and
in the surface region which is up to 4 nm deep from the surface, a ratio of a number of zinc atoms to a number of silicate atoms, obtained by X-ray photoelectron spectroscopy using AlKα X-ray radiation, is 1.5 or more when defined as a ratio of (i) a relative number of zinc atoms in the surface region, calculated from a photoelectron peak area based on a 2 p3 orbital of a zinc atom to (ii) a relative number of silicon atoms in the surface region, calculated from a photoelectron peak area based on a 2 p orbital of a silicon atom.

15. The plasma display panel of claim 14, wherein
the element in total is added in a proportion from 0.0001 mol to 0.01 mol, inclusive, to 1 mol of the phosphor main portion.

16. A plasma display panel comprising:
a pair of substrates opposing each other with a space therebetween; and
a phosphor layer formed on one of the pair of substrates and facing the space, wherein
at least part of the phosphor layer is formed with a phosphor in which at least one element from among titanium, zirconium, and hafnium is added to a phosphor main portion containing zinc silicate as a base material and manganese as an activator, wherein
the phosphor is in particulate form, and each particle has a surface region including a surface and a vicinity thereof, and in the surface region which is up to 4 nm deep from the surface, a ratio of a number of zinc atoms to a number of silicate atoms, obtained by X-ray photoelectron spectroscopy using AlKα X-ray radiation, is 1.7 or more when defined as a ratio of (i) a relative number of zinc atoms in the surface region, calculated from a photoelectron peak area based on a 3 p orbital of a zinc atom to (ii) a relative number of silicon atoms in the surface region, calculated from a photoelectron peak area based on a 2 p orbital of a silicon atom.

17. The plasma display panel of claim 16, wherein the element in total is added in a proportion from 0.0001 mol to 0.01 mol, inclusive, to 1 mol of the phosphor main position.

* * * * *

UNITED STATES PATENT AND TRADEMARK OFFICE
CERTIFICATE OF CORRECTION

PATENT NO. : 7,465,413 B2  Page 1 of 1
APPLICATION NO. : 11/121662
DATED : December 16, 2008
INVENTOR(S) : Nagasaki et al.

It is certified that error appears in the above-identified patent and that said Letters Patent is hereby corrected as shown below:

Claim 4, Column 28, line 67, "3 p" should read --3p--
Claim 4, Column 29, line 2, "2 p" should read --2p--
Claim 11, Column 29, line 54, "2 p3" should read --2p3--
Claim 11, Column 29, line 57, "2 p" should read --2p--
Claim 12, Column 30, line 1, "3 p" should read --3p--
Claim 12, Column 30, line 3, "2 p" should read --2p--
Claim 13, Column 30, line 20, "3 p" should read --3p--
Claim 13, Column 30, line 23, "2 p" should read --2p--
Claim 14, Column 30, line 45, "2 p3" should read --2p3--
Claim 14, Column 30, line 49, "2 p" should read --2p--
Claim 16, Column 31, line 7, "3 p" should read --3p--
Claim 16, Column 32, line 1, "2 p" should read --2p--.

Signed and Sealed this

Nineteenth Day of May, 2009

JOHN DOLL
*Acting Director of the United States Patent and Trademark Office*